(12) United States Patent
Murakata et al.

(10) Patent No.: US 8,059,285 B2
(45) Date of Patent: Nov. 15, 2011

(54) IMAGE FORMING APPARATUS, IMAGE PROCESSING UNIT, IMAGE PROCESSING METHOD, AND RECORDING MEDIUM HAVING IMAGE PROCESSING CONTROL PROGRAM WITH TASK MANAGEMENT

(75) Inventors: Akira Murakata, Tokyo (JP); Hiroyuki Kawamoto, Kanagawa (JP); Toshiya Hikita, Tokyo (JP); Takumi Nozawa, Kanagawa (JP); Satoshi Ohkawa, Tokyo (JP); Toshimi Yamamura, Kanagawa (JP); Atsushi Togami, Kanagawa (JP); Takeharu Tone, Kanagawa (JP); Tomoyuki Yoshida, Tokyo (JP); Yasunobu Shirata, Tokyo (JP); Shuji Kimura, Kanagawa (JP); Takanori Ito, Kanagawa (JP); Yukihiko Tamura, Kanagawa (JP); Masato Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1201 days.

(21) Appl. No.: 11/518,256

(22) Filed: Sep. 11, 2006

(65) Prior Publication Data

US 2007/0070405 A1    Mar. 29, 2007

(30) Foreign Application Priority Data

Sep. 13, 2005 (JP) ................ 2005-265855

(51) Int. Cl.
- *G06F 3/12* (2006.01)
- *H04N 1/00* (2006.01)
- *H04N 1/60* (2006.01)
- *G06K 15/00* (2006.01)

(52) U.S. Cl. ........ 358/1.13; 358/1.6; 358/1.9; 358/1.14; 358/1.15

(58) Field of Classification Search ............ 358/1.6, 358/1.14, 1.15, 1.9, 1.13
See application file for complete search history.

(56) References Cited

U.S. PATENT DOCUMENTS

| 6,384,832 | B1  | 5/2002  | Muramatsu et al. |
| 7,623,258 | B2* | 11/2009 | Kajiwara et al. ............ 358/1.15 |

(Continued)

FOREIGN PATENT DOCUMENTS

JP    05-128242    5/1993

(Continued)

OTHER PUBLICATIONS

Boulton, William, The Plain Paper Copier Industry, 1995, http://www.auburn.edu/~boultwr/copiers.pdf.*

(Continued)

*Primary Examiner* — Twyler Haskins
*Assistant Examiner* — Fred Guillermety
(74) *Attorney, Agent, or Firm* — Harness, Dickey & Pierce, P.L.C.

(57) ABSTRACT

A disclosed image forming apparatus includes an image scanning unit configured to generate image data by converting light reflected from an optically scanned printed page into electrical signals; an interface configured to receive image data from an external apparatus; an expansion bus to which the image scanning unit and the interface are connected; a bus control unit configured to control the expansion bus; an image data storage unit configured to store the image data; at least one image processing unit connected to the expansion bus and configured to perform an image processing operation on the image data; a task management unit configured to send an image processing request to the image processing unit; and an image writing unit connected to the expansion bus and configured to print the image data on which the image processing operation has been performed by the image processing unit.

40 Claims, 20 Drawing Sheets

| HARDWARE DEVICE | IMAGE PROCESSING OPERATION |
|---|---|
| CPU | GRADATION PROCESSING |
| DSP | FILTER PROCESSING |
| ASIC | GAMMA PROCESSING |

U.S. PATENT DOCUMENTS

| | | | |
|---|---|---|---|
| 2001/0015821 A1* | 8/2001 | Namizuka et al. | 358/1.15 |
| 2002/0140950 A1* | 10/2002 | Ohta et al. | 358/1.2 |
| 2005/0094183 A1* | 5/2005 | Kojima | 358/1.14 |
| 2005/0157324 A1 | 7/2005 | Miyazaki | |
| 2006/0012826 A1 | 1/2006 | Kajiwara et al. | |

FOREIGN PATENT DOCUMENTS

| | | |
|---|---|---|
| JP | 08-237491 | 9/1996 |
| JP | 11-135054 | 6/1999 |
| JP | 11-250228 | 9/1999 |
| JP | 2002-074331 | 3/2002 |
| JP | 2002-297363 | 10/2002 |
| JP | 2002-359743 | 12/2002 |
| JP | 2003-108989 | 4/2003 |
| JP | 2004-112609 | 4/2004 |
| JP | 2004-159242 | 6/2004 |
| JP | 2005-191804 | 7/2005 |
| JP | 2005-210275 | 8/2005 |
| JP | 2006-033279 | 6/2006 |

OTHER PUBLICATIONS

Yasuyuki Nomizu, et al., "Development of an imagio MFP Expansion Data Conversion Board Called Media Link Board (MLB)", by Ricoh Technical Report No. 29, p. 103-108, Dec. 1, 2003.

* cited by examiner

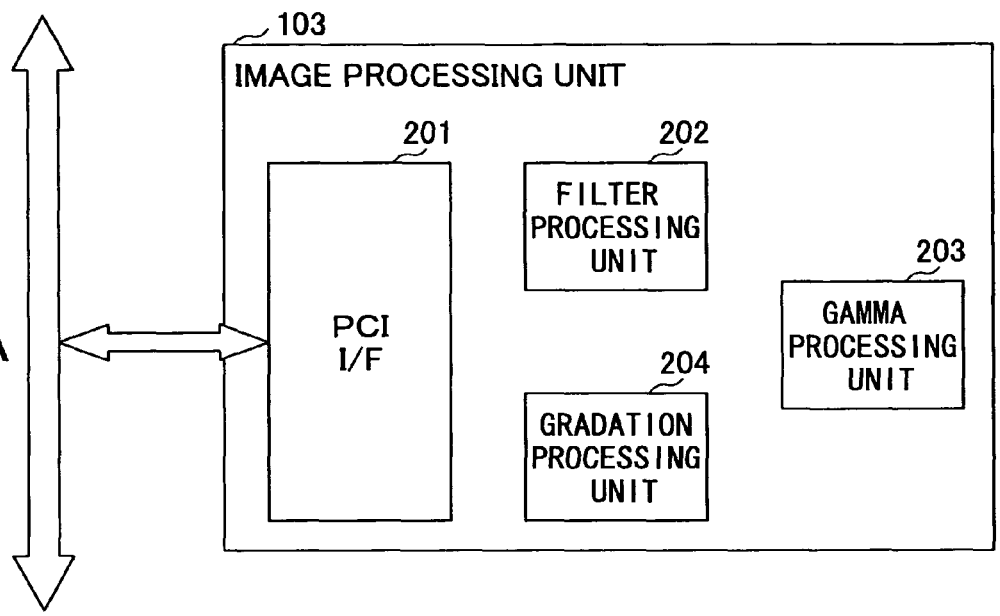
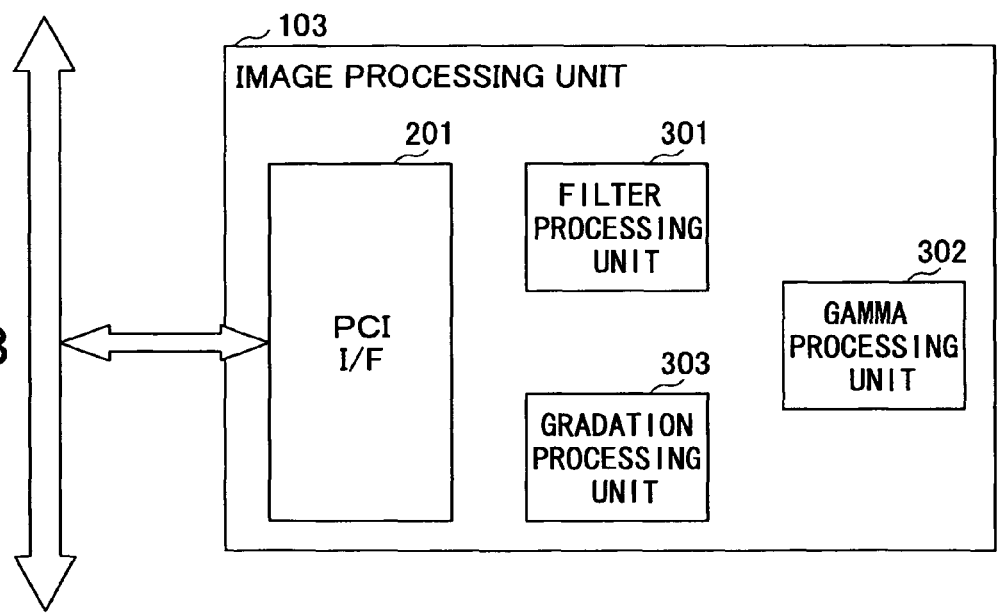

FIG.4

|  | IMAGE PROCESSING UNIT A | IMAGE PROCESSING UNIT B |
|---|---|---|
| FILTER PROCESSING | 01 | 01 |
| GRADATION PROCESSING | 10 | 01 |
| GAMMA PROCESSING | 10 | 01 |

01: PROVIDED
10: AVAILABLE

FIG.6

EXEMPLARY IMAGE PROCESSING PARAMETERS

```
const u_char FilA_Tbl[3][2] = {
// VERTICAL, HORIZONTAL
   { 3, 5},      // VARIATION A
   {10, 10},     // VARIATION B
        :        // VARIATION C
};

const u_short FilB_Tbl[3] = {
// STRENGTH
    5,           // VARIATION A
    8,           // VARIATION B
    :            // VARIATION C
};

const u_char FilC_Tbl[2][10][10] = {
    // VARIATION A
    {   5, 20,209,158,183, 0, 0, 0, 0, 0,
       98, 63,183,134,134, 0, 0, 0, 0, 0,
      209,158,  5, 20, 98, 0, 0, 0, 0, 0,
        0,  0,  0,  0,  0, 0, 0, 0, 0, 0,
        0,  0,  0,  0,  0, 0, 0, 0, 0, 0,
        0,  0,  0,  0,  0, 0, 0, 0, 0, 0,
        0,  0,  0,  0,  0, 0, 0, 0, 0, 0,
        0,  0,  0,  0,  0, 0, 0, 0, 0, 0,
        0,  0,  0,  0,  0, 0, 0, 0, 0, 0,
        0,  0,  0,  0,  0, 0, 0, 0, 0, 0
    },
    // VARIATION B
    {  11, 22,123, 77, 33,214,112,150,207,153,
       77, 33,214,112,150,207,153, 11, 22,123,
      112,150,207,153, 11, 22,123, 77, 33,214,
      153, 11, 22,123, 77, 33,214,112,150,207,
      123, 77, 33,214,112,150,207,153, 11, 22,
      214,112,150,207,153, 11, 22,123, 77, 33,
      207,153, 11, 22,123, 77, 33,214,112,150,
       22,123, 77, 33,214,112,150,207,153, 11,
       33,214,112,150,207,153, 11, 22,123, 77,
      150,207,153, 11, 22,123, 77, 33,214,112
    },
    // VARIATION C
    {
               :
               :
    }
};
```

FIG.7

```
// PROGRAM CODES
const u_long RipLib[] = {
        /* —PROGRAM A (MAIN SCANNING FILTER)— */      // VARIATION A
        0x0000040d, 0x0000140d, 0x18030c01, 0x00000000,
        0x0400c010, 0x64c90e00, 0x00000000, 0x38080cc0,
        0x1000c01c, 0xc000c11c, 0x08030c05, 0x04031c05,
        0x00001409, 0x00000409, 0x00000010,
        /* —PROGRAM A (MAIN SCANNING FILTER)— */      // VARIATION B
        0x0000040d, 0x0000c01c, 0x58080c05, 0x02b40c01,
        0x00000000, 0x0300c002, 0xeccb0e00, 0x00000000,
        0x0000c01c, 0x0100c000, 0x02b40c05, 0xf007c01c,
        0x50b42c01, 0xc2010c05, 0x0100c202, 0x18cc0e00,
        0x00000000, 0xccb01c01, 0x00000000, 0xc6011c05,
        0xe000c01c, 0xc6010c05, 0xbf00c01c,
        /* —PROGRAM B (SUB SCANNING FILTER)— */       // VARIATION A
        0x0000040d, 0x0000140d, 0x0000240d, 0x0000340d,
        0x0000440d, 0x0000540d, 0x0000640d, 0x0000740d,
        0xff3fc01c, 0xc2010c05, 0x00000000, 0xc2010c01,
        0x00000000, 0xff3fc002, 0xb8c90e00, 0x1000c01c,
        0xce010c05, 0x08000c01, 0x00033c01, 0xc0b00c01,
        0xbab01c01, 0x18030c05, 0x0000c102, 0x08ca0e00,
        0x0000c01c, 0x06020c05, 0x0e033c05, 0x74ca4008,
        0x0100c11c, 0x06021c05, 0x04ca4008, 0x0100c11c,
        0x0000c01c, 0x08021c05, 0x08020c05, 0x08020c05,
        0x08020c05, 0x08020c05, 0x08020c05, 0x08020c05,
        0x08020c05, 0x08020c05, 0x08020c05, 0x08020c05
                          :
                          :
};

const u_short FilB_Tbl[1][3] = {
        // DATA A
           5,           // VARIATION A
           8,           // VARIATION B
            :           // VARIATION C
        };
```

FIG.11A

| ADDRESS | IMAGE PROCESSING PROGRAM |
|---|---|
| OO | GRADATION PROCESSING |
| OF | FILTER PROCESSING |
| FF | GAMMA PROCESSING |
| ⋮ | ⋮ |

FIG.11B

| REGISTER | IMAGE PROCESSING FUNCTION |
|---|---|
| 1 | GRADATION PROCESSING |
| 2 | FILTER PROCESSING |
| 3 | GAMMA PROCESSING |
| ⋮ | ⋮ |

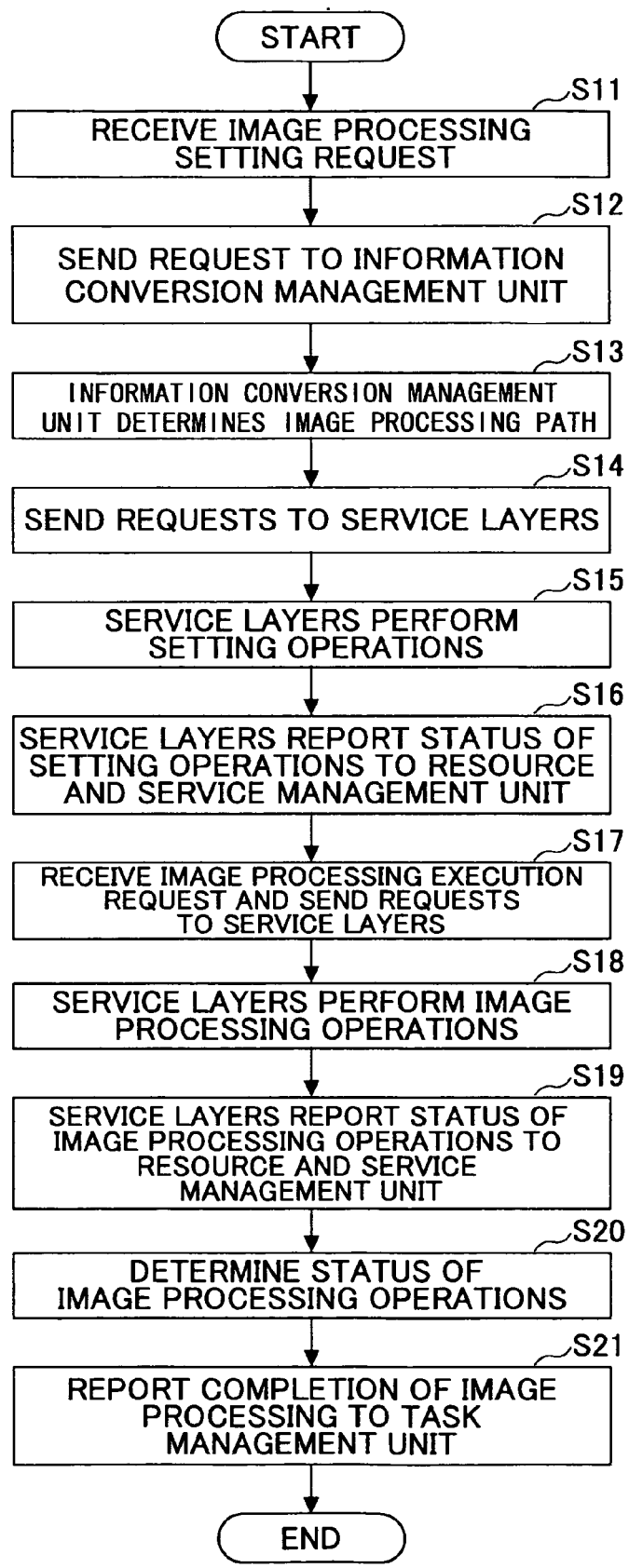

IMAGE FORMING APPARATUS, IMAGE PROCESSING UNIT, IMAGE PROCESSING METHOD, AND RECORDING MEDIUM HAVING IMAGE PROCESSING CONTROL PROGRAM WITH TASK MANAGEMENT

BACKGROUND OF THE INVENTION

1. Field of the Invention

The present invention generally relates to an image forming apparatus, an image processing unit, an image processing method, and a recording medium having an image processing control program, and more particularly relates to an image forming apparatus such as a digital copier, scanner, printer, facsimile, or a multifunction copier, and an image processing unit, image processing method, and recording medium having an image processing control program used in such an image forming apparatus.

2. Description of the Related Art

A multifunctional image forming apparatus having functions of a digital copier, printer, scanner, facsimile, and the like has been proposed (see, for example, patent document 1).

FIG. 20 is a schematic diagram illustrating an exemplary hardware configuration of a conventional image forming apparatus. In the conventional image forming apparatus shown in FIG. 20, functions of a scanner, printer, image processing unit, and the like are combined into an image processing engine 1000; and the image processing engine 1000 and a controller 1001 are connected via a general purpose bus 1002. The controller 1001 includes an operations display unit that is a user interface, an image data storage unit for storing processed image data, a communication unit for communication with external apparatuses, and a CPU that executes software programs for controlling the above units.

In the exemplary hardware configuration shown in FIG. 20, the controller 1001 communicates with an external apparatus and sends an image processing request to the image processing engine 1000; and the image processing engine 1000 performs the requested image processing. The controller 1001 stores processed image data in the image data storage unit.

As described above, in the exemplary hardware configuration, the controller 1001 communicates with an external apparatus and sends an image processing request to the image processing engine 1000 and a dedicated hardware unit of the image processing engine 1000 performs the requested image processing. Such a configuration improves individual processing efficiencies of the image processing engine 1000 and the controller 1001.

[Patent document 1] Japanese Patent Application Publication No. 2002-359743

The exemplary hardware configuration as shown in FIG. 20 has an advantage that since the image processing engine 1000 performs image processing, the controller 1001 is relieved of image processing load. However, since the image processing engine 1000 and the controller 1001 operate separately, it is difficult to make them interact to perform complicated image processing.

Especially, after an image processing operation is performed on image data and the image data are stored in the image data storage unit, it is difficult to perform another image processing operation on the image data. Thus, with a conventional image forming apparatus, only limited combinations of image processing operations are available.

Image processing operations, such as gamma processing, skew correction, and filtering, in an image processing apparatus are normally performed by hardware devices such as an application specific integrated circuit (ASIC) and a digital signal processor (DSP). An ASIC has a custom-designed circuit that provides, for example, a specific image processing function. Changing the image processing function of an ASIC requires changing the hardware itself. Therefore, in practice, it is difficult to change the function of or to add a function to an ASIC. An image processing function provided by an ASIC or DSP of the image processing engine 1000 may be implemented by software. However, since image data are stored in the image data storage unit and managed by the controller 1001, it is necessary to make the image processing engine 1000 and the controller 1001 interact to implement such an image processing function by software.

SUMMARY OF THE INVENTION

The present invention provides an image forming apparatus, an image processing unit, an image processing method, and a recording medium having an image processing control program that substantially obviate one or more problems caused by the limitations and disadvantages of the related art.

Embodiments of the present invention provide an image forming apparatus, an image processing unit, an image processing method, and a recording medium having an image processing control program that enable interaction between a controller and an image processing unit, thereby making it possible to provide various combinations of image processing operations and to easily add image processing functions.

According to an embodiment of the present invention, an image forming apparatus includes an image scanning unit configured to generate image data by converting light reflected from an optically scanned printed page into electrical signals; an interface configured to receive image data from an external apparatus; an expansion bus to which the image scanning unit and the interface are connected; a bus control unit configured to control the expansion bus; an image data storage unit configured to store the image data generated by the image scanning unit or the image data received via the interface from the external apparatus; at least one image processing unit connected to the expansion bus and configured to perform an image processing operation on the image data generated by the image scanning unit or the image data received via the interface from the external apparatus; a task management unit configured to send an image processing request to the image processing unit; and an image writing unit connected to the expansion bus and configured to print the image data on which the image processing operation has been performed by the image processing unit.

Embodiments of the present invention provide an image forming apparatus that enables interaction between a controller and an image processing unit, thereby making it possible to provide various combinations of image processing operations and to easily add image processing functions.

According to an embodiment of the present invention, the image processing unit is detachably connected to the expansion bus and is replaceable with another said image processing unit.

According to the above embodiment, an image processing unit is detachably connected to an image processing apparatus via a general-purpose expansion bus. This mechanism reduces the costs of replacing an image processing unit and thereby makes it easier to provide latest image processing functions.

According to an embodiment of the present invention, the image processing unit includes a central processing unit and an image processing processor; and, according to the image processing request sent from the task management unit, causes the central processing unit to execute an image processing program to perform an image processing operation or causes the image processing processor to perform an image processing function to perform an image processing operation.

An embodiment of the present invention makes it possible to specify an image processing program to be performed by the central processing unit according to the image processing request; or to specify an image processing function to be performed by the image processing processor according to the image processing request.

According to an embodiment of the present invention, the image processing unit includes a table assigning different image processing operations to the central processing unit and the image processing processor; and causes either the central image processing unit or the image processing processor to perform a corresponding image processing operation according to the table.

Such a mechanism makes it possible to select an appropriate hardware device in an image processing unit according to the type of image processing operation, thereby providing faster image processing.

According to an embodiment of the present invention, the image processing program to be executed by the central processing unit is updatable and changeable and a different image processing program to be executed by the central processing unit can be added.

The above embodiment makes it possible to replace image processing programs in an image processing apparatus, thereby making it easier to provide a wide range of latest image processing functions.

According to an embodiment of the present invention, the image processing unit includes an information conversion management unit configured to determine an image processing path based on the image processing request which image processing path defines image processing operations to be performed and a sequence of the image processing operations; and an image processing unit control unit configured to control, according to the image processing path, the image processing operations performed by the central processing unit or the image processing processor.

The above embodiment makes it possible to set an image processing path and to cause the central processing unit and the image processing processor to perform image processing operations according to the set image processing path.

According to an embodiment of the present invention, the image processing unit control unit determines, according to the image processing path, an image processing program to be executed by the central processing unit or an image processing function to be performed by the image processing processor.

According to an embodiment of the present invention, the information conversion management unit determines the image processing path depending on an input source of the image data which input source is any of the following: the image scanning unit, the external apparatus, and the image data storage unit.

Configuring the image processing operations depending on the input source of image data makes it possible to provide optimal image processing for the image data.

According to an embodiment of the present invention, the image processing unit control unit includes an image processing management unit configured to switch image processing programs to be executed by the central processing unit according to the image processing path; and/or an image processing processor management unit configured to switch image processing functions to be performed by the image processing processor according to the image processing path.

According to an embodiment of the present invention, after the first image processing operation is performed on the image data and the image data are stored in the image data storage unit, the image processing management unit replaces a first image processing program used to perform the first image processing operation with a second image processing program according to the image processing path and causes the central processing unit to execute the second image processing program to perform the second image processing operation; or the image processing processor management unit replaces a first image processing function used to perform the first image processing operation with a second image processing function according to the image processing path and causes the image processing processor to perform the second image processing function to perform the second image processing operation.

The above embodiment makes it possible to cause the central processing unit to execute different image processing programs in the first half and second half of image processing; or to cause the image processing processor to perform different image processing functions in the first half and second half of image processing.

According to an embodiment of the present invention, the first image processing operation is top-and-bottom identification and the second image processing operation is skew correction; and the image processing management unit performs the skew correction based on a result of the top-and-bottom identification.

According to the above embodiment, the orientation of an image is determined by the top-and-bottom identification program in the first half of the image processing and the image is rotated by the skew correction program in the second half of the image processing so that the top of the image faces north. Such an image processing makes it possible to output an image with a specific orientation (for example, northward orientation) regardless of the original orientation of an input image.

According to an embodiment of the present invention, after the first image processing operation is performed on the image data and the image data are stored in the image data storage unit together with a result of the first image processing operation, the image processing management unit replaces a first image processing program used to perform the first image processing operation with a second image processing program according to the result of the first image processing operation and causes the central processing unit to execute the second image processing program to perform the second image processing operation; or the image processing processor management unit replaces a first image processing function used to perform the first image processing operation with a second image processing function according to the result of the first image processing operation and causes the image processing processor to perform the second image processing function to perform the second image processing operation.

According to an embodiment of the present invention, the first image processing operation is illegal copy detection; and the image processing processor management unit selects the second image processing function to be used to perform the second image processing operation based on a result of the illegal copy detection.

As described above, embodiments of the present invention provide an image forming apparatus, an image processing unit, an image processing method, and a recording medium having an image processing control program that enable interaction between a controller and an image processing unit, thereby making it possible to provide various combinations of image processing operations and to easily add image processing functions.

BRIEF DESCRIPTION OF THE DRAWINGS

FIGS. 3A and 3B are block diagrams illustrating exemplary functional configurations of image processing units;

FIG. 4 is a table showing exemplary flags that are referenced by a task management unit;

FIG. 6 is a drawing showing exemplary image processing parameters to be set in an ASIC;

FIG. 7 is a drawing showing exemplary image processing parameters to be set in a DSP 403;

FIG. 11A is a table showing image processing programs and the addresses where the image processing programs are stored;

FIG. 11B is a table showing register numbers corresponding to image processing functions of an ASIC;

FIG. 13 is a flowchart illustrating an exemplary process performed by an image processing unit control unit in response to an image processing request sent from a task management unit;

DESCRIPTION OF THE PREFERRED EMBODIMENTS

Figure 1:
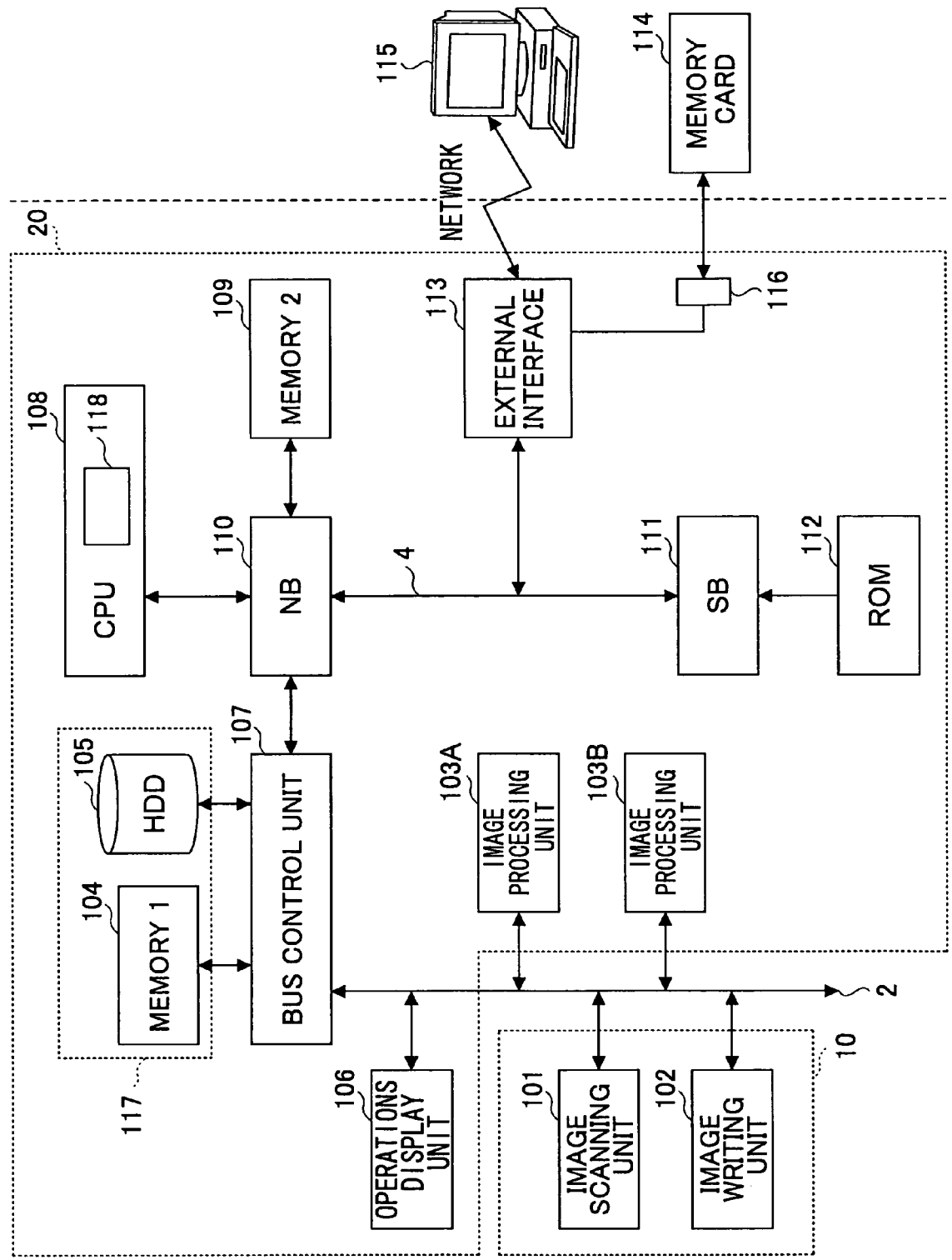
FIG. 1 is a block diagram illustrating an exemplary hardware configuration of an image forming apparatus.
Figure 2:
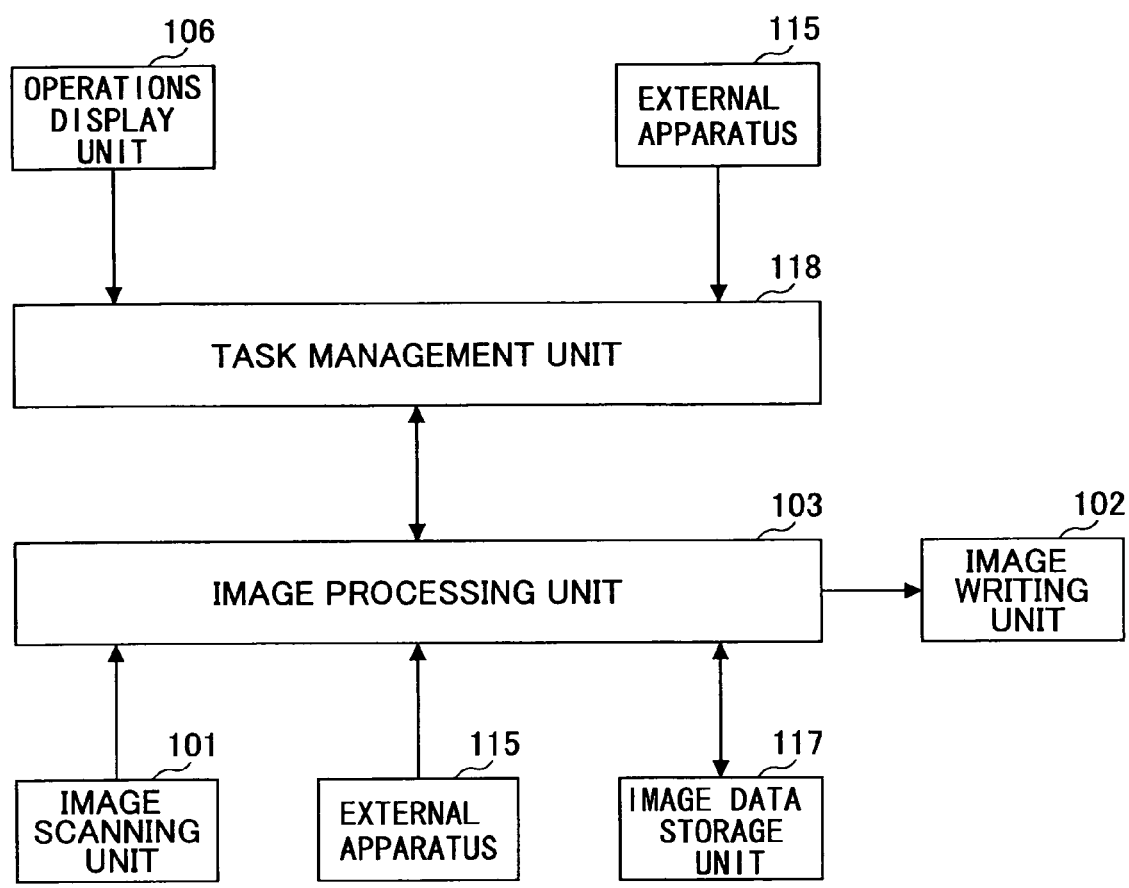
FIG. 2 is a block diagram illustrating an exemplary functional configuration of an image forming apparatus.

Preferred embodiments of the present invention are described below with reference to the accompanying drawings. FIG. 1 is a block diagram illustrating an exemplary hardware configuration of an image forming apparatus according to an embodiment of the present invention. FIG. 2 is a block diagram illustrating an exemplary functional configuration of an image forming apparatus according to an embodiment of the present invention. An image forming apparatus according to an embodiment of the present invention includes an engine 10 and a controller 20. The engine 10 and the controller 20 are connected via an expansion bus 2 so as to be able to exchange image data and control signals. The expansion bus 2 is, for example, a peripheral component interconnect bus (PCI).

The engine 10 includes an image scanning unit 101 and an image writing unit 102. The image scanning unit 101, for example, receives light reflected from an optically scanned printed page, converts the received light using a charge coupled device (CCD) or a complementary metal oxide semiconductor (CMOS) into electrical signals, digitizes the electrical signals using an A/D converter, and performs shading correction, scanner gamma correction, and the like on the digitized signals.

The image writing unit 102, for example, performs edge smoothing, correction for dot rearrangement, pulse control of image signals, format conversion between parallel data and serial data, and so on. In the image writing unit 102, image data are converted into a toner image on a photoconductive drum, the toner image is transferred onto paper, and the transferred image is fixed on the paper with heat and pressure applied by a fixing unit.

The controller 20 includes a bus control unit 107 for controlling transfer of image data through the expansion bus 2. To the expansion bus 2, an operations display unit 106 for inputting requests from the user and for displaying an operations screen for the user input and one or more image processing units 103 (in this example, two image processing units 103A and 103B) are connected.

To the bus control unit 107, a memory 104 used as primary storage, a hard disk (HDD) 105 used as secondary storage, and a north bridge (NB) 110 are connected. The memory 104 and the hard disk 105 are collectively called an image data storage unit 117.

The NB 110 interconnects a CPU 108, a memory 109 used as a working area for the CPU 108, and an expansion bus 4 so as to enable data exchange between them. To the expansion bus 4, a south bridge (SB) 111 and an external interface (I/F) 113 are connected. A ROM 112 may be connected to the SB 111. The SB 111 transfers programs and parameters stored in the ROM 112 to the CPU 108 upon request.

The external interface 113 includes a memory card slot 116 for a memory card 114 and has communication capability to communicate with an external apparatus 115 via a network such as an Ethernet (registered trademark) LAN. Using the programs stored in the ROM 112 and the memory card 114, the CPU 108 replaces the programs stored in a memory 118 of the CPU 108 or adds new programs to the memory 118.

The CPU 108 loads a control program (for example, a task management program) stored in the memory 118, and executes the control program to control the overall operation of the image forming apparatus. In the descriptions below, the function provided by the control program (the task management program) that is executed by the CPU 108 is called a task management unit 118.

The task management unit 118 manages overall tasks in the image forming apparatus, transfers image data from the image data storage unit 117 to the image processing unit 103 at a specific timing based on the processing status in the image processing unit 103, and sends an image processing request to the image processing unit 103 to perform image processing according to the content of the image data and user instructions input from the operations display unit 106 or the external apparatus 115.

Image data scanned by the image scanning unit 101 or input from the external apparatus 115 are transferred via the expansion bus 2 or 4 to the image data storage unit 117 to perform image processing according to the content of the image data and user instructions. The task management unit 118 stores the image data in the memory 104 or the hard disk 105 of the image data storage unit 117 depending on the size of the image data and depending on the storage method, such as FIFO (First In First Out), suitable for the image data.

The task management unit 118 also controls the bus control unit 107 to control the transfer of image data input from the external apparatus 115 or the image scanning unit 101 or image data stored in the image data storage unit 117. When copying, printing, etc., is requested from the operations display unit 106 or the external apparatus 115, the task management unit 118 causes the image processing unit 103 to perform digital image processing according to the request.

The image processing unit 103 performs image processing operations such as shading correction for correcting uneven distribution of illumination from a light source, scanner gamma correction for correcting density characteristics of a scanner, MTF correction, smoothing, magnification in the main scanning direction, skew correction, illegal copy prevention, density conversion according to density notches, simple multi-valuing, simple binarization, error diffusion, dithering, dot arrangement phase control (right-aligned dots, left-aligned dots), isolated point removal, image area separation (color determination, attribute determination, and adaptation), and concentration conversion.

The image processing unit 103 is detachably connected to the expansion bus 2. Although two image processing units 103 are included in the image forming apparatus shown in FIG. 1, the number of image processing units 103 may be one or more than two. Image processing functions of the image processing unit 103 can be changed or new image processing functions can be added by changing or adding programs in the image processing unit 103. Having multiple image processing units 103 makes it possible to concurrently perform the same image processing on multiple sets of image data.

When an image processing request is input from the operations display unit 106 or the external apparatus 115, the task management unit 118 controls the transfer of image data according to the type of image processing request, such as copying, facsimile transmission, image scanning, or printing, the number of pages, and the like. For example, when making multiple photocopies of a printed page, the printed page is scanned by the image scanning unit 101 only once, the image data of the scanned printed page are stored in the image data storage unit 117, and the stored image data are retrieved multiple times to make photocopies. When making only one photocopy of a printed page, the printed page is scanned and the image data of the scanned printed page may be directly output to make a photocopy. When performing MTF correction after performing shading correction, the image data are transferred via the expansion bus 2 and temporarily stored in the image data storage unit 117 after the shading correction is performed by the image processing unit 103. Then, the image data are again transferred via the expansion bus 2 to the image processing unit 103 for the MTF correction.

Exemplary image processing by the image processing unit 103 is described below. FIG. 3A is a block diagram illustrating an exemplary functional configuration of the image processing unit 103A and FIG. 3B is a block diagram illustrating an exemplary functional configuration of the image processing unit 103B. The image processing unit 103A includes an interface circuit 201, a filter processing unit 202, a gamma processing unit 203, and a gradation processing unit 204. The image processing unit 103B includes an interface circuit 201, a filter processing unit 301, a gamma processing unit 302, and a gradation processing unit 303.

When only one image processing unit 103 is installed in the image forming apparatus, the task management unit 118 sends image processing requests to the same image processing unit 103. The image processing unit 103 performs image processing operations according to image processing requests from the task management unit 118.

Each of the filter processing units 202 and 301, the gamma processing units 203 and 302, and the gradation processing units 204 and 303 may be implemented with an ASIC, DSP, or CPU as described later. The image processing function of a DSP or a CPU is implemented by a program and therefore is replaceable.

The task management unit 118 sends an image processing request to the image processing unit 103A or 103B that is installed in the image forming apparatus. When receiving an image processing request, the image processing unit 103 generates an image processing procedure, based on image processing functions of the image processing unit 103 and according to the parameters (type of a printed page, darkness, etc.) specified by the operations display unit 106, so as to achieve optimum processing results.

The task management unit 118 may be configured to refer to flags retained in the memory 109 to determine image processing functions provided in each of the image processing units 103A and 103B, and to select either the image processing unit 103A or the image processing unit 103B depending on the type of image processing. FIG. 4 is a table showing exemplary flags that are retained in the memory 109 and referenced by the task management unit 118. When the image forming apparatus is powered on or when the image processing unit 103 is connected to the expansion bus 2, the task management unit 118 detects the image processing functions provided in the image processing unit 103 and sets flags in the memory 109. Also, when an image processing function of the image processing unit 103 is requested, the task management unit 118 sets a flag indicating that the image processing function is in use. This mechanism makes it possible for the task management unit 118 to determine available image processing functions in each of the image processing units 103 and to select an appropriate image processing unit 103.

The interface circuit 201 of the image processing unit 103 receives image data for which image processing is requested and, after the requested image processing is performed on the image data, sends out the image data to the expansion bus 2. The interface circuit 201 is provided in the image processing unit 103 as an integrated module and functions as a common interface for sending/receiving image data scanned by the image scanning unit 101, image data input from the external apparatus 115, and image data stored in the image data storage unit 117.

Figures 5A, 5B:
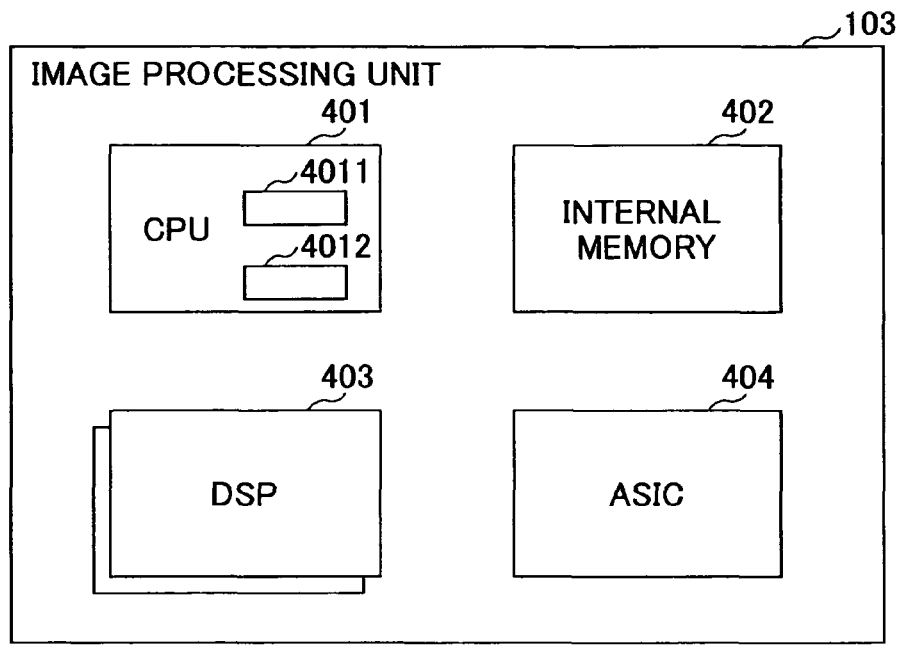
FIG. 5A is a block diagram illustrating an exemplary hardware configuration of an image processing unit.
FIG. 5B is a table showing the correspondence between image processing operations and the hardware devices in the image processing unit shown in FIG. 5A.

The interface circuit 201 may be implemented in, for example, an ASIC 404 (see FIG. 5A). With such a configuration, an ASIC request management unit 604 described later of the image processing unit 103 can be used to control the interface circuit 201.

The interface circuit 201 conforms to an expansion bus standard (for example, PCI, PCI-X, or PCI Express) that defines a bus width, bus frequency, bus signal amplitude, and so on, and thereby makes it easier to replace an image processing unit. For example, a pre-installed image processing unit can be easily replaced with another image processing unit having a different filtering function. Such a mechanism makes it possible to change functions of and add functions to an image forming apparatus without replacing the image forming apparatus itself.

[Selection of Appropriate Hardware Device Depending on the Type of Image Processing Operation]

According to an embodiment of the present invention, an appropriate hardware device of the image processing unit 103 can be selected depending on the type of image processing operation. As described above, there are many types of image processing operations including image processing operations such as filtering where image data are accessed sequentially and image processing operations where image data are accessed randomly. For example, a certain type of image processing operation may be performed faster by a CPU with software, another type of image processing operation may be performed faster by a DSP, and still another type of image processing operation may be performed faster by a dedicated image processing hardware device (ASIC). Thus, there are certain relationships between image processing operations and hardware devices. Therefore, the efficiency of image processing can be improved by assigning image processing operations to appropriate hardware devices.

FIG. 5A is a block diagram illustrating an exemplary hardware configuration of the image processing unit 103. The image processing unit 103 includes a CPU 401, an internal memory 402, one or more DSPs 403 that perform different image processing operations depending on loaded programs, and an ASIC 404 that performs a specific image processing operation. A field programmable gate array (FPGA) may be used for the DSP 403.

The CPU 401 of the image processing unit 103 executes an image processing unit control program and an image processing program 4012 both stored in an internal memory in the CPU 401. In the descriptions below, the function provided by the image processing unit control program being executed by the CPU 401 is called an image processing unit control unit 4011.

The image processing unit control unit 4011 controls image processing operations performed by the DSP 403 and the ASIC 404. The image processing program 4012 performs a certain image processing operation using the internal memory 402 implemented with, for example, a RAM.

FIG. 5B is a table showing the correspondence between image processing operations and the hardware devices in the image processing unit 103 shown in FIG. 5A. As shown in FIG. 5B, gradation processing is performed by the CPU 401 using the image processing program 4012, filter processing is performed by the DSP 403, and gamma processing is performed by the ASIC 404.

The image processing unit control unit 4011 controls the CPU 401 and the other hardware devices by referring to the correspondence table as shown in FIG. 5B. The image processing unit control unit 4011 performs preparatory operations according to an image processing request input from the operations display unit 106 or the external apparatus 115 and the correspondence table shown in FIG. 5B. Such preparatory operations include sending image processing parameters to the ASIC 404 to make necessary settings for a requested image processing operation and downloading an image processing program for another requested image processing operation to the DSP 403.

FIG. 6 is a drawing showing exemplary image processing parameters to be set in the ASIC 404. The image processing parameters shown in FIG. 6 specify values of the registers in the ASIC 404 according to the assigned image processing operation. The image processing parameters are provided as tables of numeric values. The image processing parameters are stored in the ROM 112.

When each of the registers is 16 bits wide and when image processing parameters are for filter processing, the image processing parameters may be structured as follows:

Register A (upper 8 bits: vertical matrix size, lower 8 bits: horizontal matrix size)
Register B (16 bits: filter matrix strength)
Register C through register Z (each 16 bits: filter matrix)

FIG. 7 is a drawing showing exemplary image processing parameters to be set in the DSP 403. Image processing parameters for the DSP 403 includes programs and data. The DSP 403 performs an image processing operation according to the programs set by the image processing parameters (downloaded programs). The DSP 403 executes the downloaded programs by referring to the data, such as a threshold value for threshold processing or gamma data for gamma processing, set by the image processing parameters. The programs and data are provided as tables of numeric values and stored in the ROM 112.

When image processing parameters are for filter processing, the image processing parameters may be structured as follows:

Programs A (main scanning filter)
Program B (sub scanning filter)
Data A (strength)

Figure 8:
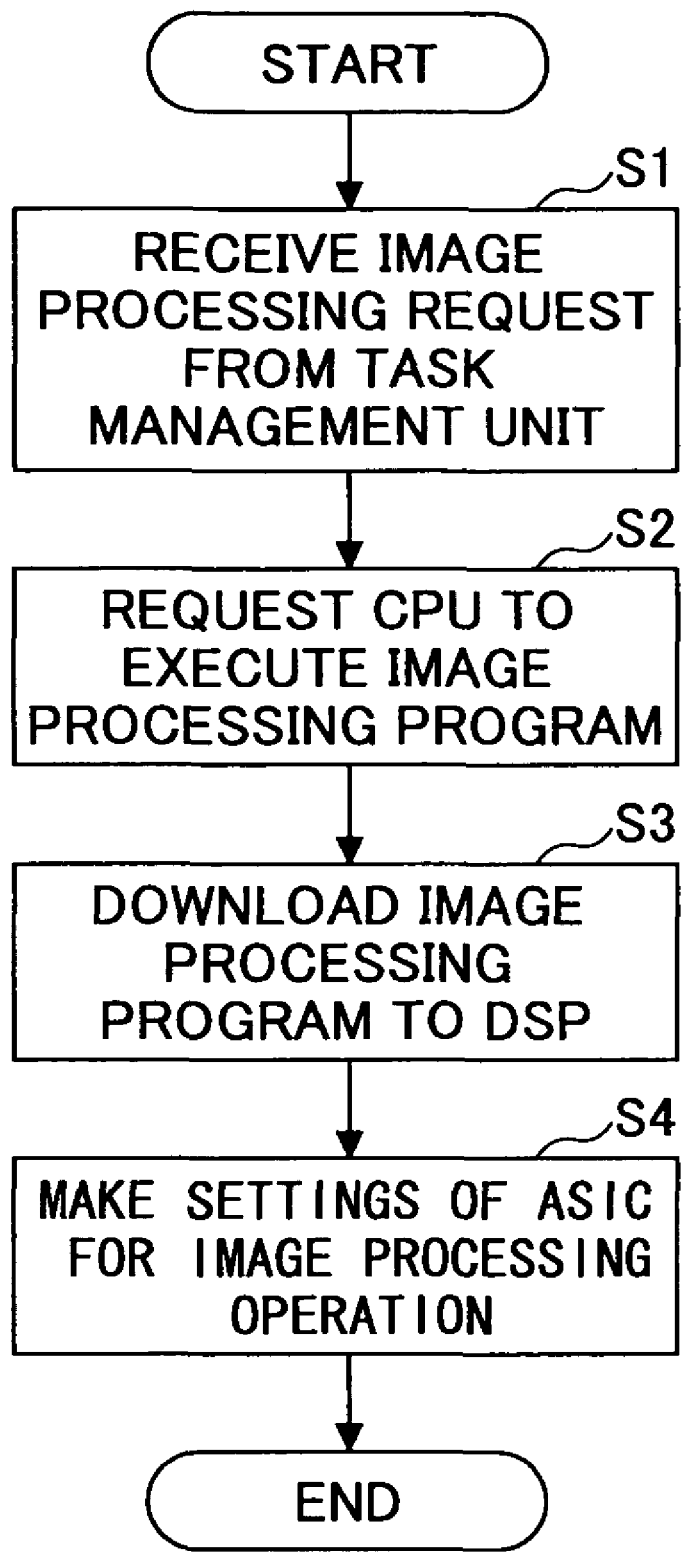
FIG. 8 is a flowchart illustrating an exemplary process performed by an image processing unit control unit.

FIG. 8 is a flowchart illustrating an exemplary process performed by the image processing unit control unit 4011. The image processing unit control unit 4011 receives an image processing request from the task management unit 118 (S1).

The image processing unit control unit 4011 refers to the correspondence table shown in FIG. 5B and causes, for example, the CPU 401 to execute a gradation processing program 4012 (S2). The gradation processing program 4012 obtains gradation processing parameters (for example, the number of bits for gradation). The image processing unit control unit 4011 downloads filter processing programs to the DSP 403 (S3) and makes necessary settings of the ASIC 404 for gamma processing (for example, specification of the corresponding register number) (S4).

Figure 9:
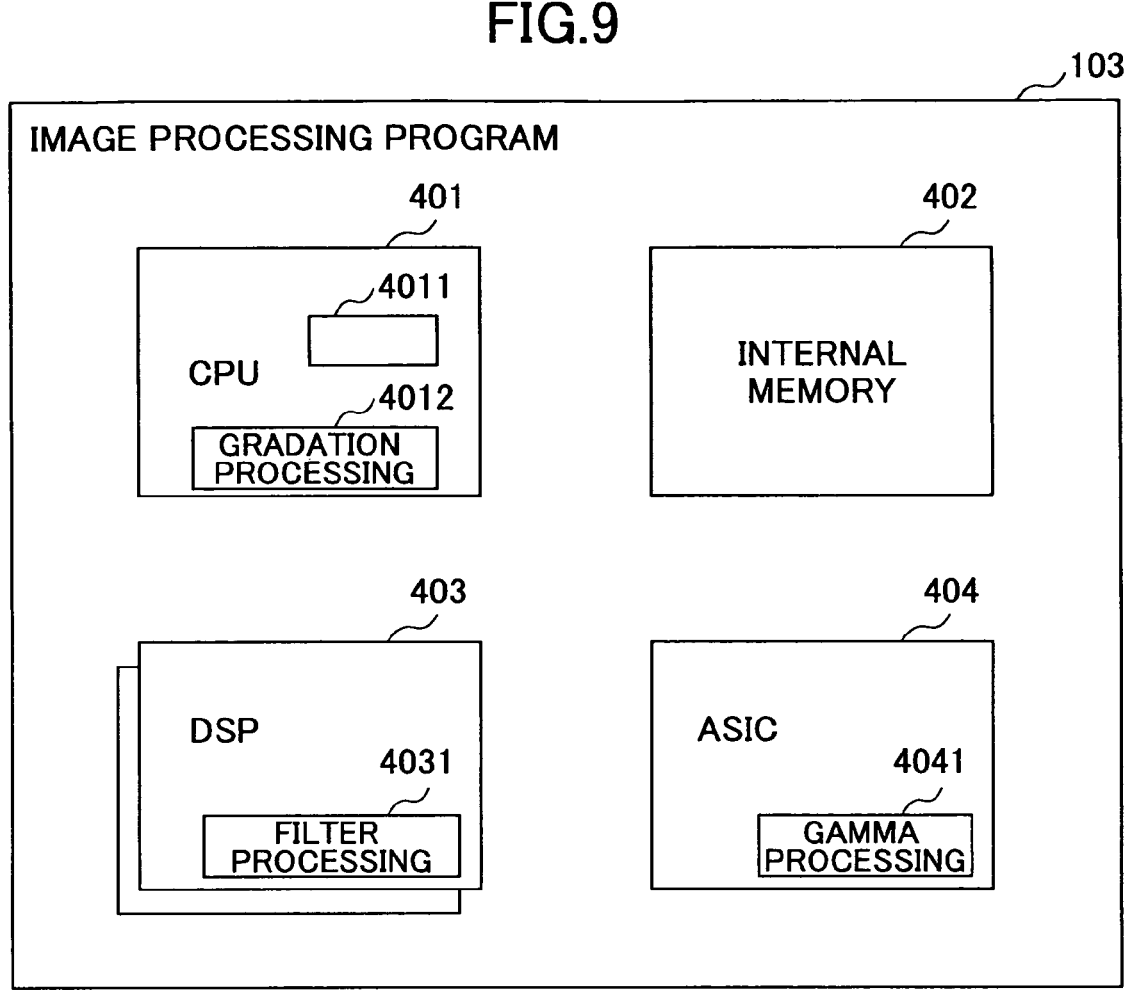
FIG. 9 is a block diagram illustrating exemplary image processing operations assigned to a CPU, DSP, and ASIC of an image processing unit.

FIG. 9 is a block diagram illustrating exemplary image processing operations assigned to the CPU 401, DSP 403, and ASIC 404 by the image processing unit control unit 4011. In the example shown in FIG. 9, the CPU 401 executes the gradation processing program 4012, the DSP 403 executes a filter processing program 4031, and the ASIC 404 performs gamma processing. The gamma processing or filter processing may be performed by the CPU 401.

After assigning image processing operations to the hardware devices as shown in FIG. 9, the image processing unit control unit 4011 notifies the task management unit 118 of the completion of preparatory operations for image processing and requests the task management unit 118 to transfer image data to be processed. When receiving the request for image data, the task management unit 118 transfers image data to the image processing unit 103.

When receiving the image data, the image processing unit control unit 4011 transfers the image data to the DSP 403 and the ASIC 404. When the image processing operations by the DSP 403 and the ASIC 404 are completed, the CPU 401 perform gradation processing using the gradation processing program 4012 and the internal memory 402.

When the gradation processing by the gradation processing program 4012 is completed, the image processing unit control unit 4011 transfers the processed image data via the expansion bus 2 to the image data storage unit 117 and notifies the task management unit 118 of the completion of image processing.

As described above, in an image forming apparatus according to an embodiment of the present invention, image processing operations are assigned to appropriate hardware devices. This mechanism improves the efficiency of image processing.

[Image Processing by Software]

Figure 10:
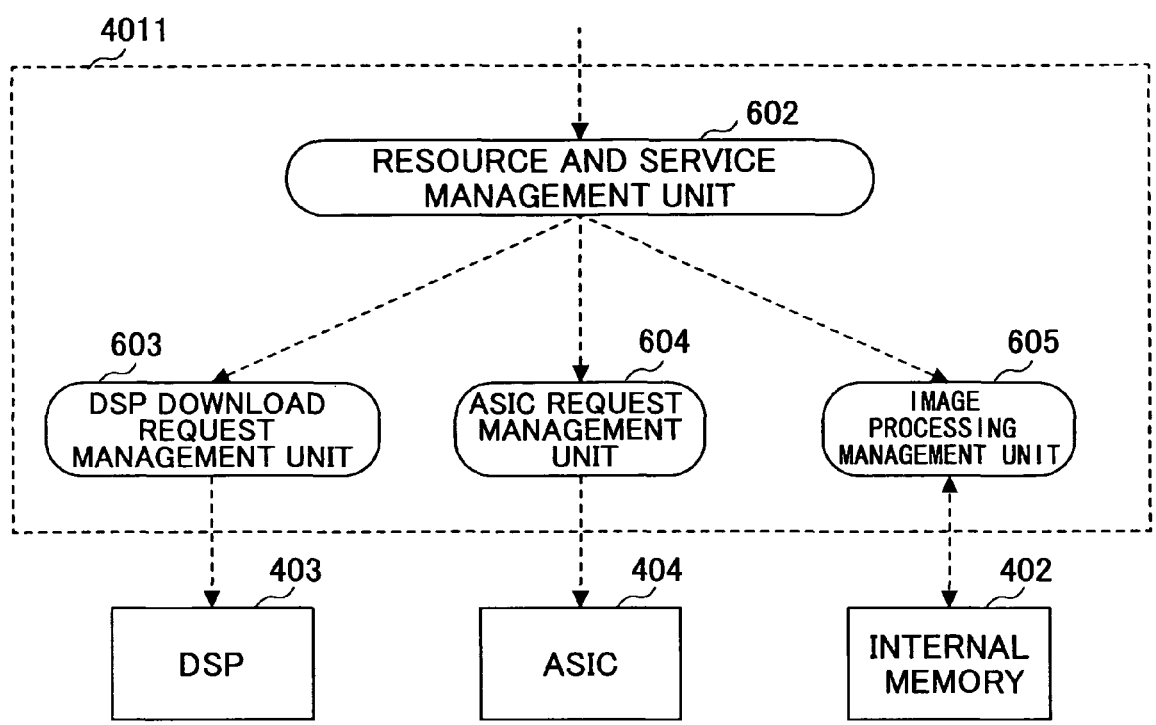
FIG. 10 is a block diagram illustrating an exemplary functional configuration of an image processing unit control unit.

FIG. 10 is a block diagram illustrating an exemplary functional configuration of the image processing unit control unit 4011. The image processing unit control unit 4011 includes a resource and service management unit 602, a DSP download request management unit 603, an ASIC request management unit 604, and an image processing management unit 605.

The resource and service management unit 602 manages image processing operations of the image processing unit 103. For example, the resource and service management unit 602 monitors the programs downloaded onto the DSP 403 and the settings of the ASIC 404. For this purpose, the resource and service management unit 602 generates the DSP download request management unit 603 for managing programs downloaded to the DSP 403, the ASIC request management unit 601 for managing the settings of the ASIC 404, and the image processing management unit 605 for managing a program executed by the CPU 401.

The DSP download request management unit 603 manages the information for the DSP 403 including the programs used by the DSP 403 to perform image processing operations and the addresses of the programs. FIG. 11A is a table showing image processing programs managed by the DSP download request management unit 603 and the addresses where the image processing programs are stored. Image processing programs such as a gradation processing program, filter processing program, and gamma processing program are stored in a ROM of the image processing unit 103 and can be downloaded to the DSP 403 by specifying the addresses.

The ASIC request management unit 604 manages the register numbers of registers in the ASIC 404 each register number corresponding to an image processing function. FIG. 11B is a table showing register numbers managed by the ASIC request management unit 604 each register number corresponding to an image processing function. When the ASIC request management unit 604 specifies a register number, the ASIC 404 performs an image processing operation according to the image processing function corresponding to the specified register number.

When an image processing request is sent from the task management unit 118, the resource and service management unit 602 sends corresponding image processing operation requests to the DSP download request management unit 603 and the ASIC request management unit 604. The DSP download request management unit 603 refers to the address where an image processing program corresponding to the image processing operation request is stored and downloads the image processing program to the DSP 403. The ASIC request management unit 604 specifies the register number of an image processing function of the ASIC 404 which image processing function corresponds to the image processing operation request.

The image processing management unit 605 manages information for the image processing program executed by the CPU 401. More specifically, the image processing management unit 605 manages image processing parameters, memory areas in the internal memory 402, and the addresses of the memory areas used by the image processing program executed by the CPU 401.

When an image processing operation request is sent from the resource and service management unit 602, the image processing management unit 605 obtains the image processing parameters for the image processing operation requested by the image processing operation request and performs the image processing operation on the image data.

According to an embodiment of the present invention, the image processing program executed by the CPU 401 can be replaced with another image processing program. The image processing management unit 605 causes the CPU 401 to perform gradation processing according to an image processing operation request from the resource and service management unit 602. The CPU 401 loads a gradation processing program and performs gradation processing using the internal memory 402.

For example, the image processing management unit 605 replaces the gradation processing program with another gradation processing program without changing the functions of the DSP 403 and the ASIC 404. This mechanism allows the image processing management unit 605 to perform different types of gradation processing operations. When a first gradation processing program is replaced with a second gradation processing program, the first gradation program is saved in an internal memory in the CPU 401 or in the internal memory 402. Therefore, the image processing management unit 605 can select and execute an appropriate gradation processing program according to the type of image data and the image processing operation request from the resource and service management unit 602. The second gradation processing program may be stored in the ROM 112 or the internal memory in the CPU 401, or provided by the memory card 114.

[Configuration of Image Processing Functions of Image Processing Unit According to Image Processing Path]

According to an embodiment of the present invention, the image processing functions of the image processing unit 103 can be reconfigured according to an image processing path. The image processing path is determined based on the instructions and information from the operations display unit 106 or the external apparatus 115.

Figure 12A:
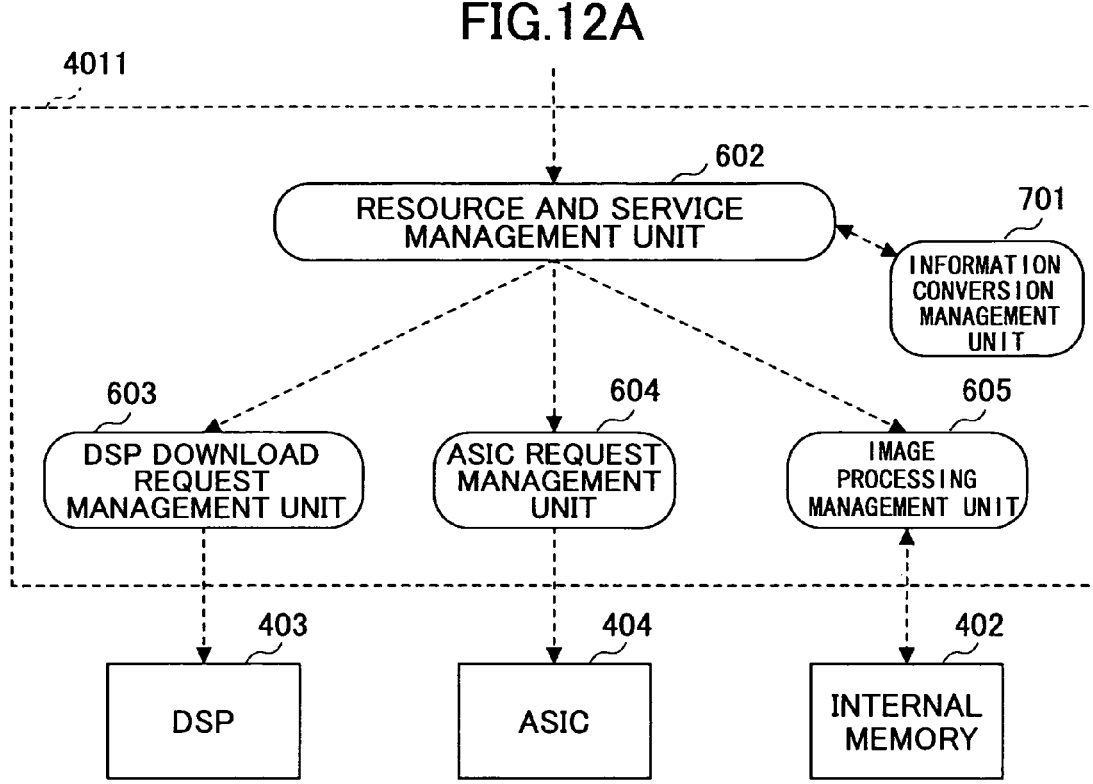
FIG. 12A is a block diagram illustrating an exemplary functional configuration of an image processing unit control unit according to another embodiment of the present invention.

FIG. 12A is a block diagram illustrating an exemplary functional configuration of the image processing unit control unit 4011 according to another embodiment of the present invention. In FIG. 12A, the same reference numbers are used for parts corresponding to those shown in FIG. 10, and descriptions of those parts are omitted. The image processing unit control unit 4011 shown in FIG. 12A includes an information conversion management unit 701.

Figure 12B:
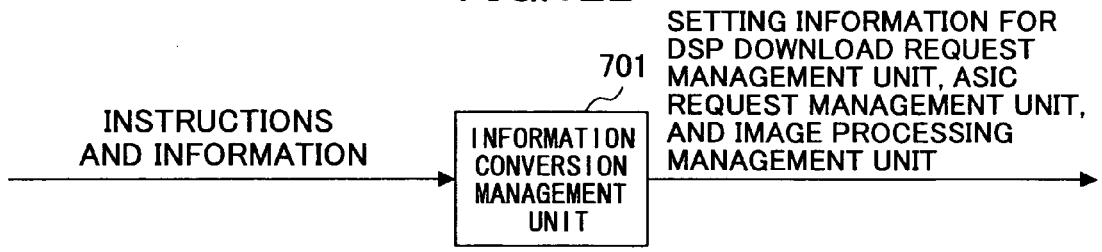
FIG. 12B is a drawing illustrating an exemplary process performed by information conversion management unit.

FIG. 12B is a drawing illustrating an exemplary process performed by the information conversion management unit 701. The information conversion management unit 701 converts instructions and information sent from the operations display unit 106 or the external apparatus 115 to the image processing unit 103 into setting information for the DSP download request management unit 603, the ASIC request management unit 604, and the image processing management unit 605. The DSP download request management unit 603, the ASIC request management unit 604, and the image processing management unit 605 use the setting information to make necessary settings for the DSP 403, the ASIC 404, and the image processing operation by the CPU 401, respectively. For example, when copying is requested from the operations display unit 106, the information conversion management unit 701 converts the instructions and information in the request into setting information necessary for filter processing, gamma processing, and gradation processing.

Also, the information conversion management unit 701 determines an image processing path according to the instructions and information sent to the image processing unit 103. When an image processing request is sent from the task management unit 118, the information conversion management unit 701 performs preparatory operations for the image processing requested by the image processing request before image data are sent via the expansion bus 2 from the task management unit 118. At this stage, the information conversion management unit 701 determines an image processing path according to the instructions and information in the image processing request. An image processing path defines image processing operations, such as gradation processing, gamma processing, and filter processing, to be performed on the image data and the sequence of the image processing operations.

FIG. 13 is a flowchart illustrating an exemplary process performed by the image processing unit control unit 4011 in response to an image processing request from the task management unit 118.

The image processing unit control unit 4011 receives an image processing setting request and an image processing execution request from the task management unit 118 (S11). The image processing unit control unit 4011 performs preparatory operations for image processing according to the image processing setting request and performs the image processing according to the image processing execution request. Preparatory operations include setting image processing parameters and reserving areas in the internal memory 403.

In response to the image processing setting request from the task management unit 118, the image processing unit control unit 4011 causes the resource and service management unit 602 to request the information conversion management unit 701 to convert the instructions and information in the image processing setting request (S12). Then, as described above, the information conversion management unit 701 determines an image processing path (S13). The resource and service management unit 602 sends setting requests to the DSP download request management unit 603, the ASIC request management unit 604, and the image processing management unit 605 (S14). Each of the DSP download request management unit 603, the ASIC request management unit 604, and the image processing management unit 605 performs a setting operation for the corresponding image processing operation (S15) and then notifies the resource and service management unit 602 of the status of the setting operation (S16). After all preparatory operations are completed, the image processing unit control unit 4011 notifies the task management unit 118 of the completion of the preparatory operations.

In the descriptions below, the DSP download request management unit 603, the ASIC request management unit 604, and the image processing management unit 605 are called service layers.

When the image processing unit control unit 4011 receives the image processing execution request from the task management unit 118, the resource and service management unit 602 sends image processing operation execution requests to the service layers (S17). Each of the service layers causes the corresponding hardware device to perform an image processing operation (S18) and reports image processing operation status to the resource and service management unit 602 (S19). The resource and service management unit 602 determines the status of image processing operations (S20) and, when all image processing operations are completed, notifies the task management unit 118 of the completion of the requested image processing (S21). In the above process, the image processing operations are controlled by the service layers.

Image scanning and image writing are described below as examples of image processing shown in FIG. 13.

Figure 14:
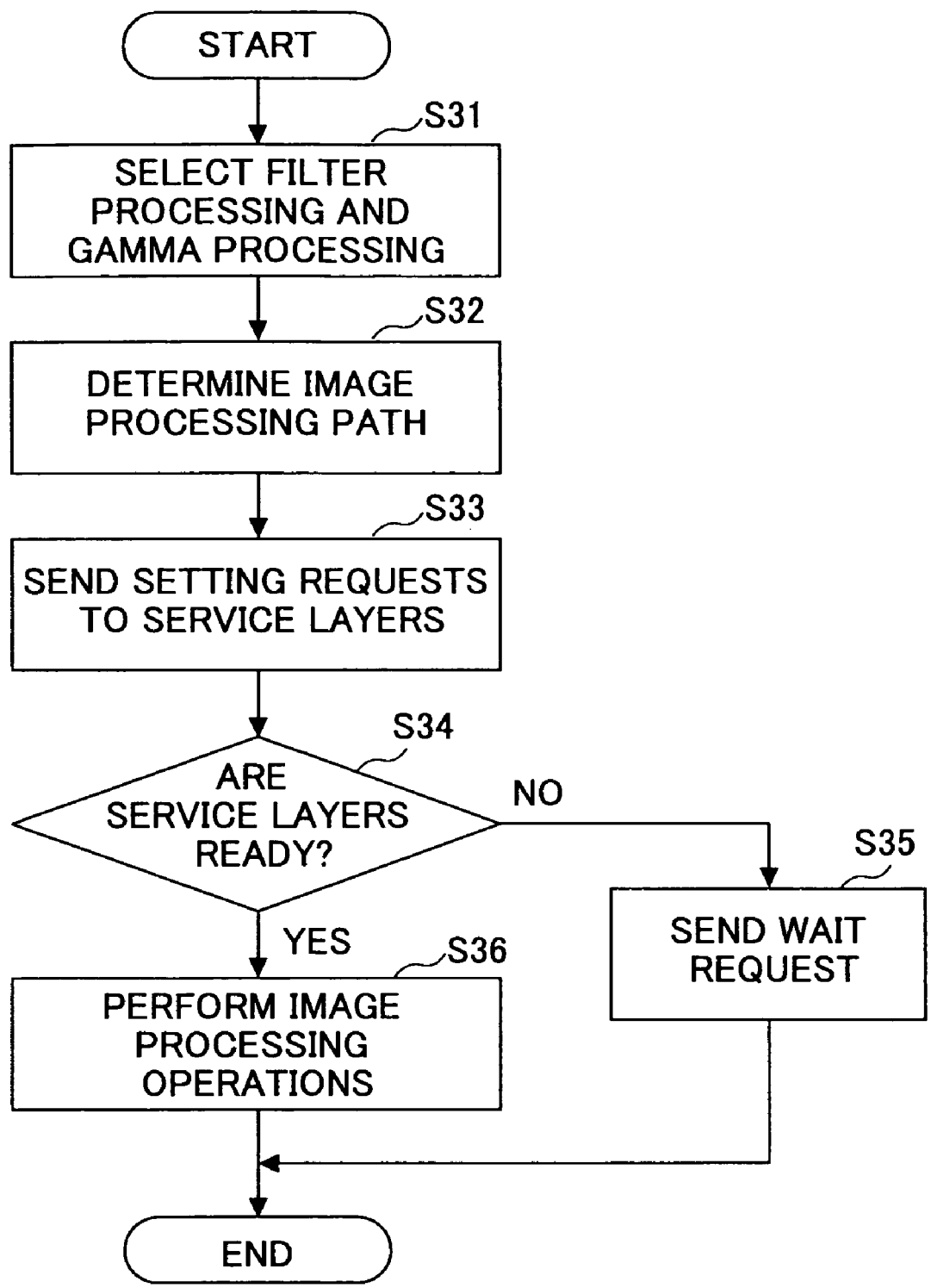
FIG. 14 is a flowchart illustrating exemplary image processing performed when scanning an image using an image scanning unit.

FIG. 14 is a flowchart illustrating exemplary image processing performed when scanning an image using the image scanning unit 101. When an image is input from the image scanning unit 101, the information conversion management unit 701 selects, for example, filter-processing and gamma processing to correct scanning characteristics (S31).

In the image processing unit 103 shown in FIG. 9, filter processing is assigned to the DSP 403 and gamma processing is assigned to the ASIC 404. In this case, the information conversion management unit 701 converts instructions and information in the image processing setting request into setting information for the DSP 403 and the ASIC 404, determines an image processing path including the filter processing by the DSP 403 and the gamma processing by the ASIC 404 (S32), and notifies the resource and service management unit 602 of the determined image processing path.

According to the image processing path, the resource and service management unit 602 sends setting requests to the DSP download request management unit 603 and the ASIC download request management unit 604 to perform preparatory operations for the filter processing and gamma processing (S33). The resource and service management unit 602 also manages the status of setting operations by the DSP download request management unit 603, the ASIC request management unit 604, and the image processing management unit 605.

The resource and service management unit 602 determines whether the service layers are ready to perform setting operations (S34). When the completion of setting operations or the completion of image processing operations for the previous image processing request has not been reported to the resource and service management unit 602 from each of the service layers, the resource and service management unit 602 requests the task management unit 118 to wait for a certain period of time and then to send the image processing request again (S35), and terminates the process. Such a resource management mechanism makes it possible to efficiently control multiple image processing requests.

Figure 15:
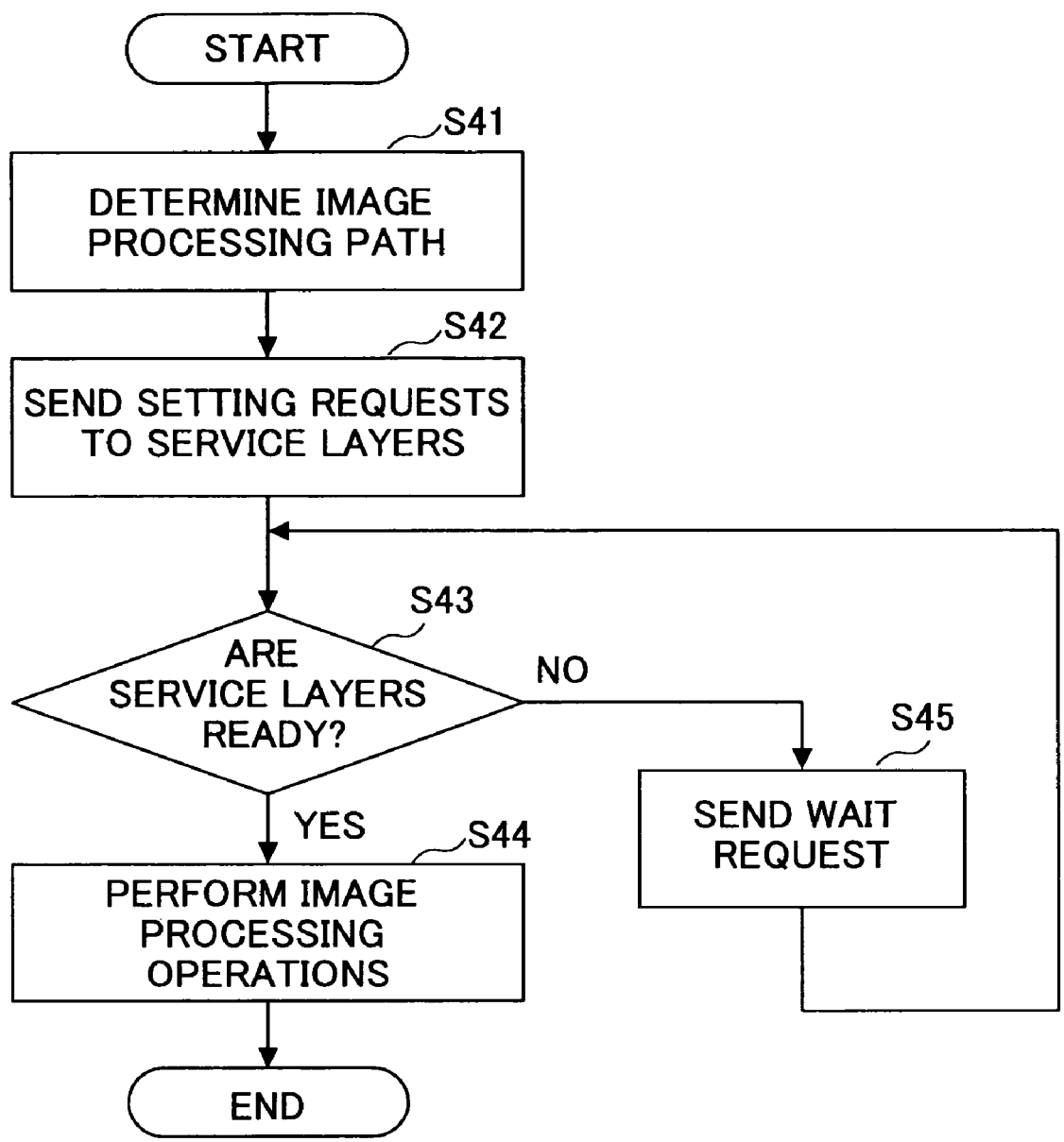
FIG. 15 is a flowchart illustrating exemplary image processing performed when outputting image data using an image writing unit.

FIG. 15 is a flowchart illustrating exemplary image processing performed when outputting image data using the image writing unit 102. When outputting image data using the image writing unit 102, the information conversion management unit 701 selects, for example, gradation processing.

As described above, gradation processing is performed by the CPU 401 using a program. Therefore, in this case, the resource and service management unit 602 sends a setting request to the image processing management unit 605 as well as to the DSP download request management unit 603 and the ASIC download request management unit 604. The information conversion management unit 701 converts instructions and information in the image processing setting request into setting information for all service layers, determines an image processing path that includes filter processing, gamma processing, and gradation processing (S41), and notifies the resource and service management unit 602 of the determined image processing path.

The resource and service management unit 602 performs resource management and sends setting requests to the service layers (S42). The service layers perform setting operations. After the setting operations are completed, the image processing unit 103 is ready for image processing.

As shown in step S43 in FIG. 15, the resource and service management unit 602 determines whether the service layers are ready to perform setting operations (S43). When the service layers are ready, the service layers perform setting operations and image processing operations (S44). When the service layers are not ready, the resource and service management unit 602 requests the task management unit 118 to wait for a certain period of time and then send the image processing request again (S45).

As described above, the image processing functions of the image processing unit 103 can be reconfigured based on an image processing path. This mechanism makes it possible to flexibly reconfigure the image processing functions of an image processing unit.

As described above, the image processing unit 103 includes the interface circuit 201 and can obtain image data scanned by the image scanning unit 101, image data input from the external apparatus 115, and image data stored in the image data storage unit 117 via the same interface circuit 201. The input source of image data may be identified by a flag attached to the image data or by input source information sent together with a control signal from the task management unit 118 to the image processing unit 103. It is preferable to perform appropriate image processing depending on the input source of image data. In an image forming apparatus of an embodiment of the present invention, an image processing path is determined depending on the input source of image data. For example, an image processing path for the image data input from the image scanning unit 101 may include filter processing, skew correction, and gamma correction; and an image processing path for the image data input from the external apparatus 115 may include filter processing and gamma processing.

When an image processing request is sent from the task management unit 118, the information conversion management unit 701 determines an image processing path depending on the input source and the type of image processing, for example, as shown in FIGS. 14 and 15. Configuring the image processing functions of an image processing unit depending on the input source of image data makes it possible to provide optimal image processing for the image data.

[Reconfiguration of Image Processing Functions of Image Processing Unit According to the Results of Image Processing Operations]

Figure 16:
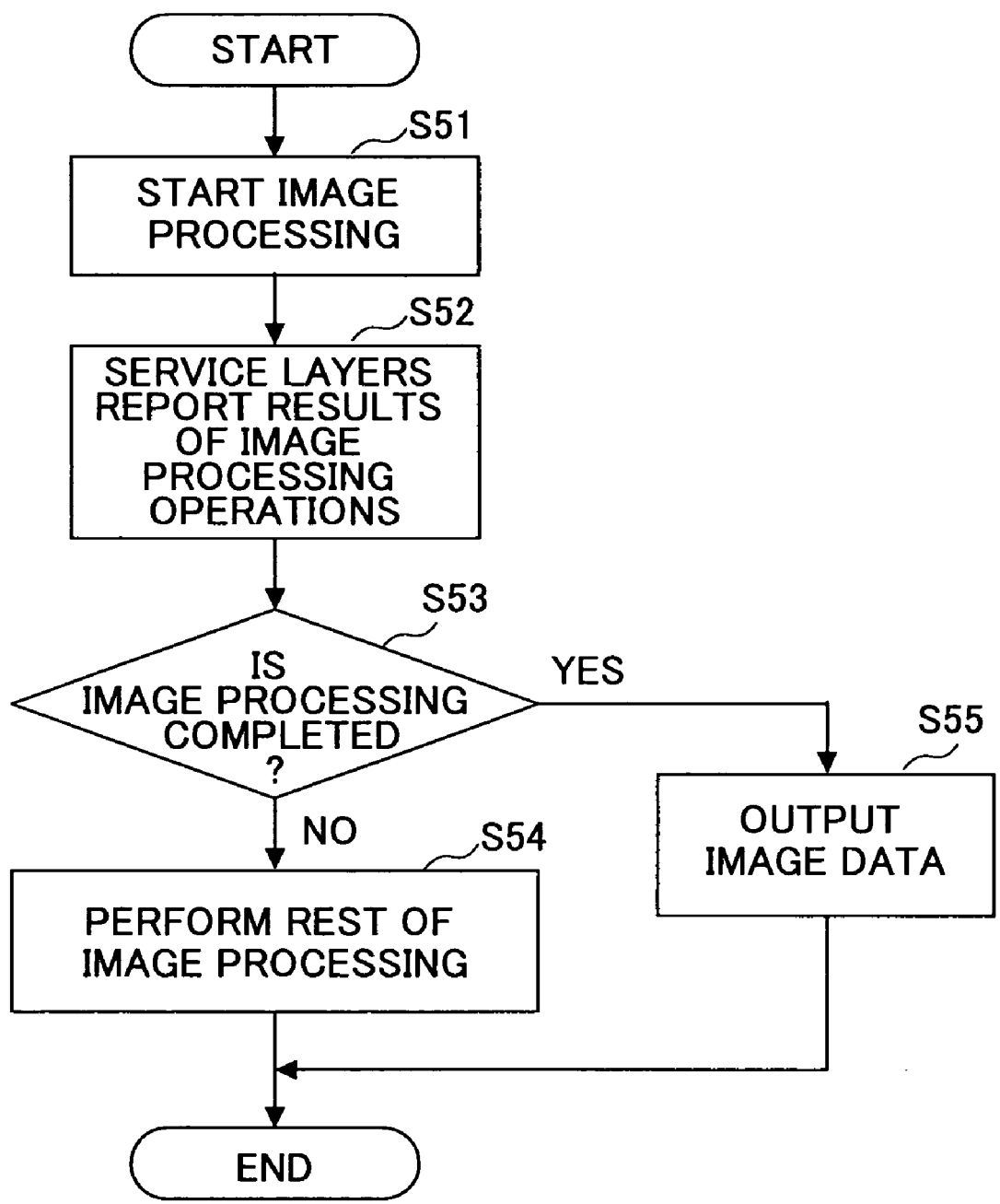
FIG. 16 is a flowchart illustrating an exemplary process where, after an image processing operation is performed on image data, another image processing operation is performed on the same image data.

According to an embodiment of the present invention, the image processing functions of the image processing unit 103 can be reconfigured according to the results of image processing operations. FIG. 16 is a flowchart illustrating an exemplary process where, after an image processing operation is performed on image data, another image processing operation is performed on the same image data.

The information conversion management unit 701 determines an image processing path according to an image processing request from the task management unit 118 and performs image processing (S51). The DSP download request management unit 603, the ASIC request management unit 604, and the image processing management unit 605 report the results of image processing operations to the resource and service management unit 602 (S52).

The resource and service management unit 602 determines based on the reported results whether the image processing has been completed (S53). The resource and service management unit 602 may instead determine whether the image processing has been completed based on the image processing path.

When the image processing has not been completed, the resource and service management unit 602 notifies the task management unit 118 of the processing status and requests the task management unit 118 to transfer again the image data stored in the image data storage unit 117 to the image processing unit 103 (S54). When the image processing has been completed, the resource and service management unit 602 notifies the task management unit 118 of the completion of the image processing and requests the task management unit 118 to transfer the image data to the image writing unit 102 or to the external apparatus 115 via the network (S55).

When image data are transferred again to the image processing unit 103, a different image processing operation is performed on the image data. For example, it is possible to perform multiple image processing operations on the image data using the same DSP 403.

Figure 17:
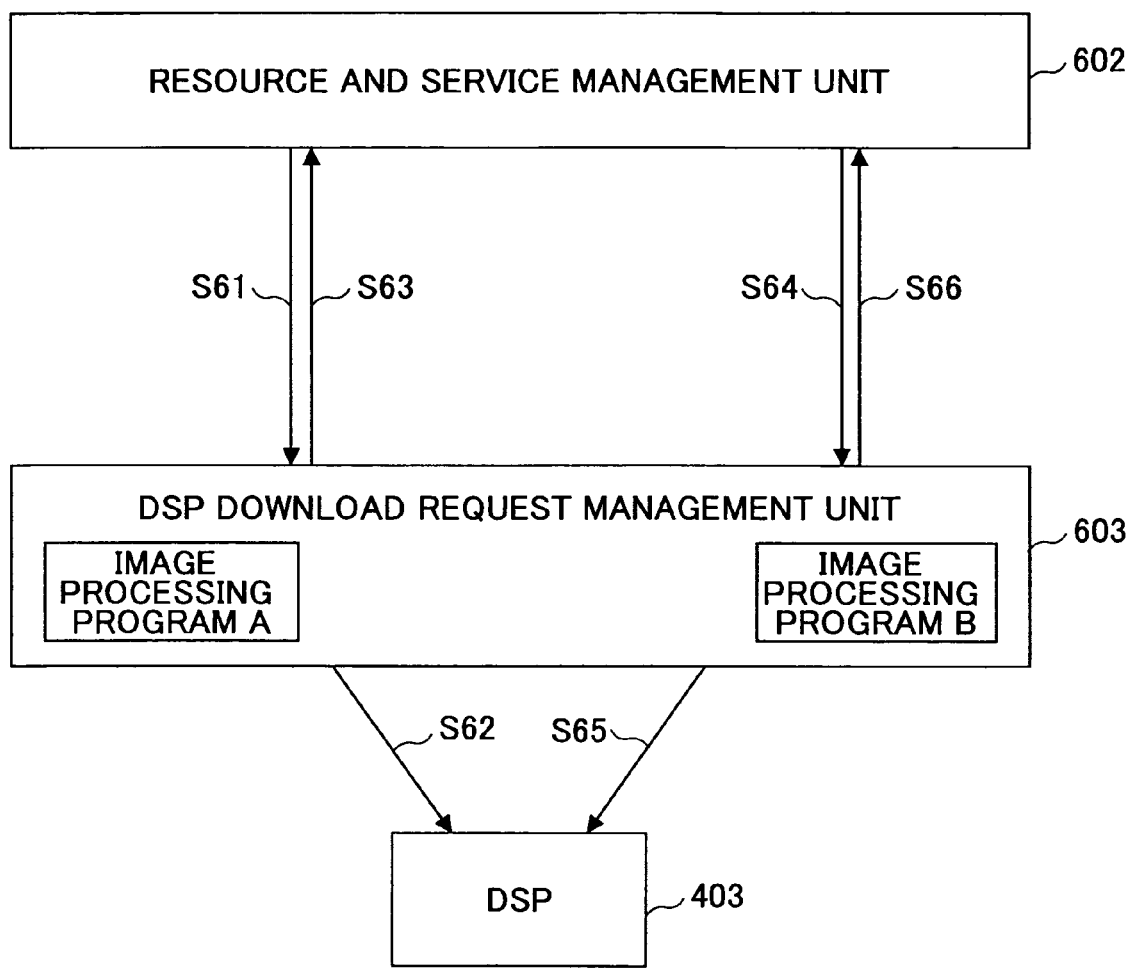
FIG. 17 is a drawing illustrating an exemplary process where different image processing programs are used by a DSP for a first image processing operation and for a second image processing operation.

FIG. 17 is a drawing illustrating an exemplary process where different image processing programs are used by the DSP 403 for a first image processing operation and for a second image processing operation. In FIG. 17, an image processing request is sent from the task management unit 118 to the image processing unit 103 in each of the first half and second half of the image processing. In FIG. 17, the DSP download request management unit 603 is taken as an example.

When a first image processing request (for the first half of the image processing) is sent from the task management unit 118 to the image processing unit control unit 4011, the resource and service management unit 602 of the image processing unit control unit 4011 sends a first image processing operation request to a service layer (in this example, the DSP download request management unit 603) (S61).

The DSP download request management unit 603 for controlling the DSP 403 downloads an image processing program A from, for example, the ROM 112 according to the first image processing operation request (S62). The DSP download request management unit 603 makes necessary settings of the DSP 403 for the first image processing operation request and, when image data are transferred, causes the DSP 403 to execute the image processing program A. After the first image processing operation, the image data are temporarily stored in the image data storage unit 117.

After the first image processing operation using the image processing program A, the DSP download request management unit 603 notifies the resource and service management unit 602 that the first image processing operation has been completed (S63).

The resource and service management unit 602 then requests the task management unit 118 to send a second image processing request. When the second image processing request (for the second half of the image processing) is sent from the task management unit 118 to the image processing unit 103, the resource and service management unit 602 of the image processing unit control unit 4011 sends a second image processing operation request to the DSP download request management unit 603 (S64).

The DSP download request management unit 603 for controlling the DSP 403 downloads an image processing program B from, for example, the ROM 112 according to the second image processing operation request (S65). The DSP download request management unit 603 makes necessary settings of the DSP 403 for the second image processing operation request and, when the image data are transferred from the image data storage unit 117, causes the DSP 403 to execute the image processing program B.

After the second image processing operation, the DSP download request management unit 603 notifies the resource and service management unit 602 that the second image processing operation has been completed (S66).

The resource and service management unit 602 then reports the completion of the image processing for the image data to the task management unit 118. As described above, an embodiment of the present invention makes it possible to perform different image processing operations stepwise on the same image data using one image processing unit 103.

The CPU 401 can also be used to perform different image processing operations in the first half and second half of image processing.

Figure 18:
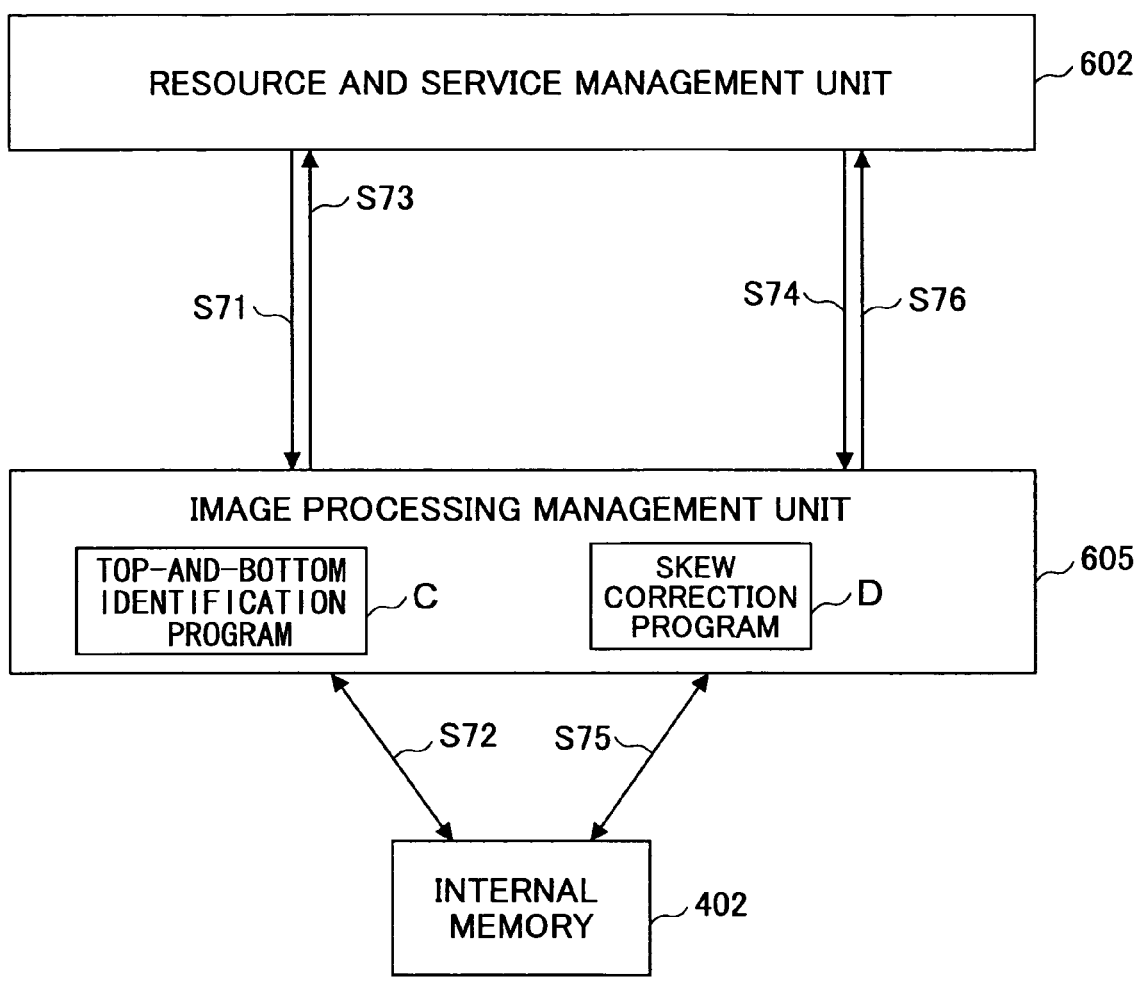
FIG. 18 is a drawing illustrating an exemplary process where a top-and-bottom identification program is used by a CPU 401 for a first image processing operation and a skew correction program is used for a second image processing operation.

FIG. 18 is a drawing illustrating an exemplary process where a top-and-bottom identification program is used by the CPU 401 for a first image processing operation and a skew correction program is used for a second image processing operation. In FIG. 18, the image processing management unit 605 switches image processing programs in the first half and second half of the image processing. In the first half of the image processing, a top-and-bottom identification program is executed.

The details and image processing parameters of the second half of the image processing change depending on the results of the top-and-bottom identification. In the skew correction in the second half of the image processing, a precise tilt angle of an image is obtained from the results of the top-and-bottom identification and the image is rotated based on the obtained tilt angle. As described above, an embodiment of the present invention makes it possible to obtain the characteristics of image data in the first half of image processing and to perform the second half of image processing based on the obtained characteristics of the image data.

The interaction between the task management unit 118 and the image processing unit 103 is substantially the same as that described with reference to FIG. 17, except that the image processing management unit 605 performs image processing operations by executing programs using the internal memory 402.

When a first image processing request (for the first half of the image processing) is sent from the task management unit 118 to the image processing unit control unit 4011, the resource and service management unit 602 of the image processing unit control unit 4011 sends a first image processing operation request to the image processing management unit 605 (S71).

The image processing management unit 605 executes an image processing program C (top-and-bottom identification program) according to the first image processing operation request using the internal memory 402 (S72). The results of the top-and-bottom identification are written in the header of the image data. The image processing management unit 605 notifies the resource and service management unit 602 that the first image processing operation has been completed (S73). After the first image processing operation, the image data are temporarily stored in the image data storage unit 117.

The resource and service management unit 602 then requests the task management unit 118 to send a second image processing request. When the second image processing request (for the second half of the image processing) is sent from the task management unit 118 to the image processing unit 103, the resource and service management unit 602 of the image processing unit control unit 4011 sends a second image processing operation request to the image processing management unit 605 (S74).

The image processing management unit 605 executes an image processing program D (skew correction program) according to the second image processing operation request (S75). In the second half of the image processing, the image is rotated to correct its orientation based on the results of the top-and-bottom identification written in the header of the image data in the first half of the image processing.

After the second image processing operation, the image processing management unit 605 notifies the resource and service management unit 602 that the second image processing operation has been completed (S76). The resource and service management unit 602 then reports the completion of the image processing for the image data to the task management unit 118.

As described above, an embodiment of the present invention makes it possible to determine the characteristics of image data in the first half of the image processing and to perform the second half of the image processing based on the determined characteristics of the image data, thereby providing optimum image processing. In the above example, the orientation of an image is determined by the top-and-bottom identification program in the first half of the image processing and the image is rotated by the skew correction program in the second half of the image processing so that the top of the image faces north. Such image processing makes it possible to output an image with a specific orientation (for example, northward orientation) regardless of the original orientation of an input image. An image forming apparatus according to the present invention may be configured so that both the DSP 403 and the CPU 401 perform different image processing operations in the first half and second half of image processing.

Figure 19:
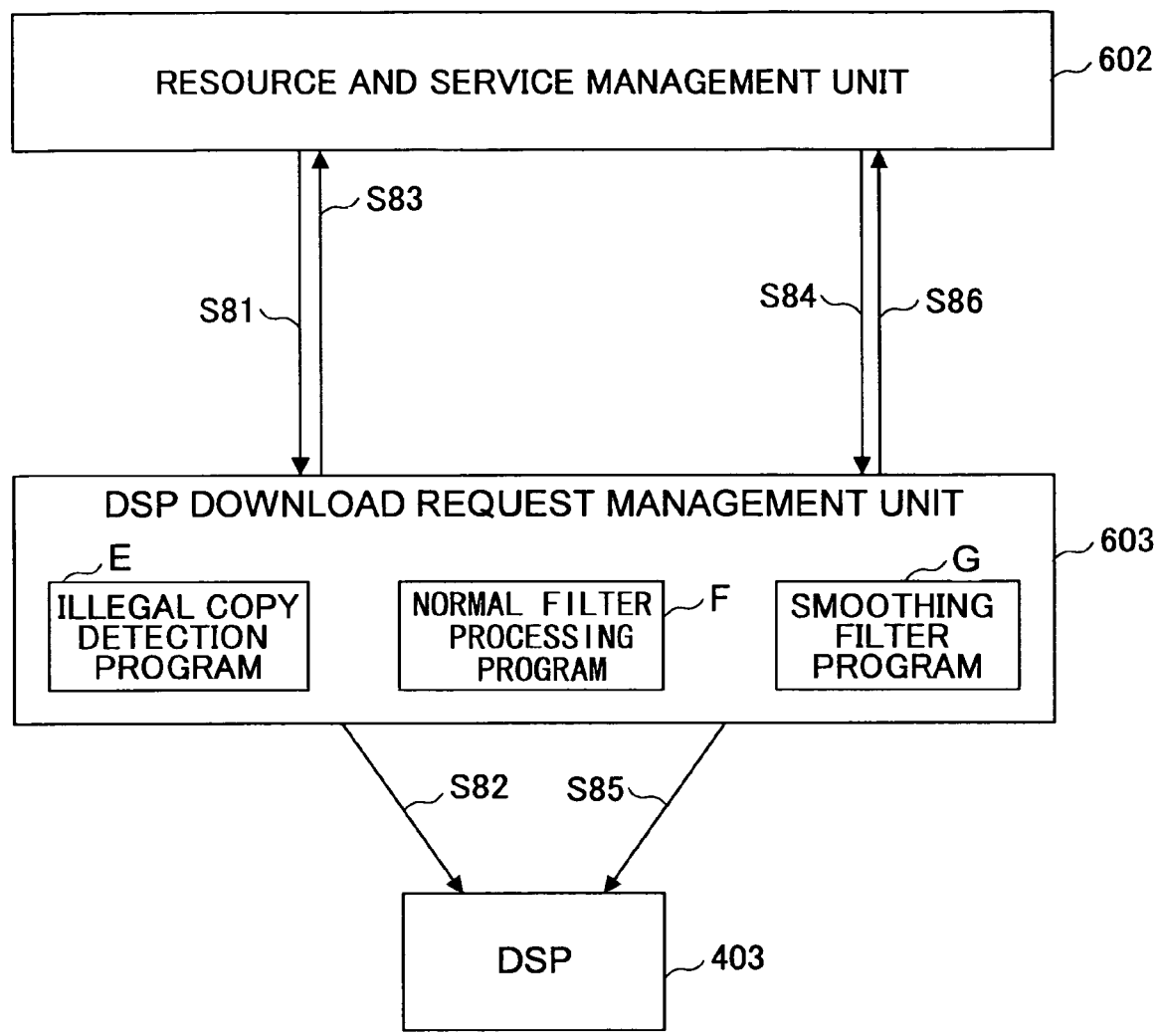
FIG. 19 is a drawing illustrating an exemplary process where, after illegal copy detection is performed as a first image processing operation, an image processing program is selected for a second image processing operation depending on the result of the illegal copy detection and is executed by a DSP to implement illegal copy prevention.
Figure 20:
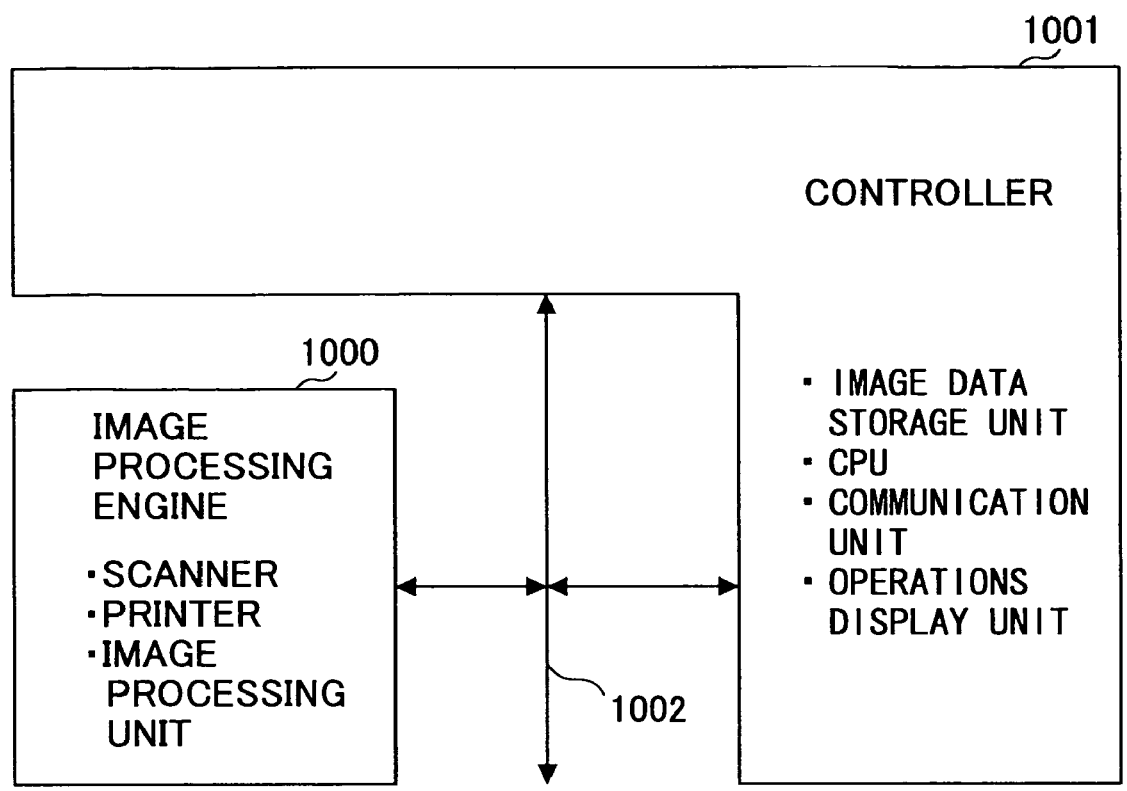
FIG. 20 is a schematic diagram illustrating an exemplary hardware configuration of a conventional image forming apparatus.

An image forming apparatus according to an embodiment of the present invention makes it possible to select an appropriate image processing operation depending on the result of the previous image processing operation. FIG. 19 is a drawing illustrating an exemplary process where, after illegal copy detection is performed as a first image processing operation, an image processing program is selected for a second image processing operation depending on the result of the illegal copy detection and is executed by the DSP 403 to implement illegal copy prevention. In FIG. 19, the DSP 403 is taken as an example.

When a first image processing request (for the first half of the image processing) is sent from the task management unit 118 to the image processing unit control unit 4011, the resource and service management unit 602 of the image processing unit control unit 4011 sends a first image processing operation request to the DSP download request management unit 603 (S81).

The DSP download request management unit 603 for controlling the DSP 403 downloads an image processing program E (illegal copy detection program) from, for example, the ROM 112 according to the first image processing operation request (S82). The DSP download request management unit 603 makes necessary settings for the first image processing operation request and, when image data are transferred, causes the DSP 403 to execute the image processing program E. Whether an image is an illegal copy is determined based on various types of information. For example, for an image input from the image scanning unit 101, authentication information is used to determine whether the image is an illegal copy; for an image stored in the image data storage unit 117, a copy protection character, tint block, etc. is used; and for an electronic image obtained from the network, file attributes are used. The result of the illegal copy detection is written in the header of the image data. After the first image processing operation, the image data are temporarily stored in the image data storage unit 117.

After the first image processing operation using the image processing program E, the DSP download request management unit 603 notifies the resource and service management unit 602 that the first image processing operation has been completed (S83). Although not shown in FIG. 19, the ASIC request management unit 604 and the image processing management unit 605 also notify the resource and service management unit 602 that respective first image processing operations have been completed.

The resource and service management unit 602 then requests the task management unit 118 to send a second image processing request. When the second image processing request (for the second half of the image processing) is sent from the task management unit 118 to the image processing unit 103, the resource and service management unit 602 of the image processing unit control unit 4011 sends a second image processing operation request to the DSP download request management unit 603 (S84).

When the image data are transferred from the image data storage unit 117, the DSP download request management unit 603 refers to the result of the illegal copy detection written in the header of the image data and determines whether the image is an illegal copy. When the image is an illegal copy, the DSP download request management unit 603 performs an image processing operation that prevents normal copying of the image (S85).

In the example shown in FIG. 19, the DSP download request management unit 603 downloads a smoothing filter program G that obscures an image to the DSP 403 and causes the DSP 403 to execute the smoothing filter program G.

When the image is not an illegal copy, the DSP download request management unit 603 downloads a filter processing program F that improves the quality of an image to the DSP 403 and causes the DSP 403 to execute the filter processing program F (S85). After the second image processing operation is completed, the DSP download request management unit 603 notifies the resource and service management unit 602 of the completion of the second image processing operation (S86). The resource and service management unit 602 then reports the completion of the image processing for the image data to the task management unit 118.

As described above, an image forming apparatus according to an embodiment of the present invention makes it possible to select an appropriate second image processing operation depending on the result of a first image processing operation. This embodiment makes it possible, for example, to determine whether an image is an illegal copy in the first image processing operation and, when the image is an illegal copy, to select a second image processing operation that obscures the image.

As described above, embodiments of the present invention enable interaction between the image processing unit 103 for performing image processing and the controller 20 for controlling the image processing, thereby improving flexibility in image processing and enabling various combinations of image processing operations. According to an embodiment of the present invention, image data are managed by the task management unit 118 of the controller 20 and are transferred from the image data storage unit 117 to the image processing unit 103 each time when an image processing operation is performed. This mechanism enables performing two or more image processing operations on the same image data, which is difficult with a conventional image forming apparatus.

According to an embodiment, multiple image processing units can be detachably connected to an image processing apparatus via general-purpose expansion buses. This mechanism reduces the costs of replacing image processing units and thereby makes it easier to provide the latest image processing functions. Also, such a mechanism makes it possible to select an image processing unit according to the type of image processing to achieve faster image processing.

An embodiment of the present invention makes it possible to perform different image processing operations in the first half and second half of image processing, thereby enabling various combinations of image processing operations. For example, an embodiment of the present invention makes it possible to obtain the characteristics of image data in the first half of image processing and to perform the second half of image processing based on the obtained characteristics of the image data.

According to an embodiment of the present invention, the image processing unit 103 can cause the CPU and DSP to perform multiple image processing operations using image processing programs. This mechanism makes it possible to reduce the number of hardware devices in the image processing unit 103, thereby reducing the production cost. Installing multiple image processing units 103 makes it possible to concurrently perform the same image processing on multiple sets of image data.

Embodiments of the present invention make it possible to easily improve, add, or change image processing functions of an image forming apparatus by upgrading the programs in the image forming apparatus without changing the image forming apparatus itself. Further, embodiments of the present invention make it possible to reduce the number of hardware devices such as ASICs in an image processing unit which hardware devices require long development time.

The present invention is not limited to the specifically disclosed embodiments, and variations and modifications may be made without departing from the scope of the present invention.

The present application is based on Japanese Priority Application No. 2005-265855, filed on Sep. 13, 2005, the entire contents of which are hereby incorporated herein by reference.

What is claimed is:

1. An image forming apparatus, comprising:
an image scanning unit configured to generate image data by converting light reflected from an optically scanned printed page into electrical signals;
an interface configured to receive image data from an external apparatus;
an expansion bus to which the image scanning unit and the interface are connected;
a bus control unit configured to control the expansion bus;
an image data storage unit configured to store the image data generated by the image scanning unit or the image data received via the interface from the external apparatus;
at least one image processing unit connected to the expansion bus and configured to perform an image processing operation on the image data generated by the image scanning unit or the image data received via the interface from the external apparatus;
a task management unit configured to send an image processing request for requesting image processing to the at least one image processing unit, to transfer image data from the image data storage unit to the at least one image processing unit at a specific timing based on a processing status in the at least one image processing unit, and to send the image processing request to the least one image processing unit to perform image processing according to a content of the image data and user instructions input from the external apparatus; and an image writing unit connected to the expansion bus and configured to print the image data on which the image processing operation has been performed by the at least one image processing unit, wherein the at least one image processing unit further includes:

a resource and service management unit, and such that when a completion of setting operations or a completion of image processing operations for a previous image processing request has not been reported to the resource and service management unit, the resource and service management unit requests the task management unit to wait for a period of time and send the image processing request again; and an information conversion management unit configured to determine an image processing path based on the image processing request which image processing path defines image processing operations to be performed and a sequence of the image processing operations, the image processing path defines the image processing operations via at least one of gradation processing, gamma processing, and filter processing.

2. The image forming apparatus as claimed in claim 1, wherein the at least one image processing unit is detachably connected to the expansion bus and is replaceable with another image processing unit.

3. The image forming apparatus as claimed in claim 1, wherein the at least one image processing unit includes a central processing unit and an image processing processor; and, according to the image processing request sent from the task management unit, causes the central processing unit to execute an image processing program to perform an image processing operation or causes the image processing processor to perform an image processing function to perform an image processing operation.

4. The image forming apparatus as claimed in claim 3, wherein the at least one image processing unit includes a table assigning different image processing operations to the central processing unit and the image processing processor; and causes either the central processing unit or the image processing processor to perform a corresponding image processing operation according to the table.

5. The image forming apparatus as claimed in claim 3, wherein the image processing program to be executed by the central processing unit is updatable and changeable and a different image processing program to be executed by the central processing unit can be added.

6. The image forming apparatus as claimed in claim 3, wherein the at least one image processing unit further includes
an image processing unit control unit configured to control, according to the image processing path, the image processing operations performed by the central processing unit or the image processing processor.

7. The image forming apparatus as claimed in claim 6, wherein the image processing unit control unit determines, according to the image processing path, an image processing program to be executed by the central processing unit or an image processing function to be performed by the image processing processor.

8. The image forming apparatus as claimed in claim 6, wherein the information conversion management unit determines the image processing path depending on an input source of the image data which input source is one of the image scanning unit, the external apparatus, and the image data storage unit.

9. The image forming apparatus as claimed in claim 6, wherein the image data on which a first image processing operation has been performed by the at least one image processing unit are sent via the expansion bus to the image data storage unit and temporarily stored therein; the image data are then sent back to the at least one image processing unit and a second image processing operation is performed on the image data by the at least one image processing unit.

10. The image forming apparatus as claimed in claim 9, wherein the image processing unit control unit includes at least one of an image processing management unit configured to switch image processing programs to be executed by the central processing unit according to the image processing path and an image processing processor management unit configured to switch image processing functions to be performed by the image processing processor according to the image processing path.

11. The image forming apparatus as claimed in claim 10, wherein, after the first image processing operation is performed on the image data and the image data are stored in the image data storage unit, the image processing management unit replaces a first image processing program used to perform the first image processing operation with a second image processing program according to the image processing path and causes the central processing unit to execute the second image processing program to perform the second image processing operation; or the image processing processor management unit replaces a first image processing function used to perform the first image processing operation with a second image processing function according to the image processing path and causes the image processing processor to perform the second image processing function to perform the second image processing operation.

12. The image forming apparatus as claimed in claim 11, wherein the first image processing operation is top-and-bottom identification and the second image processing operation is skew correction; and the image processing management unit performs the skew correction based on a result of the top-and-bottom identification.

13. The image forming apparatus as claimed in claim 10, wherein, after the first image processing operation is performed on the image data and the image data are stored in the image data storage unit together with a result of the first image processing operation, the image processing management unit replaces a first image processing program used to perform the first image processing operation with a second image processing program according to the result of the first image processing operation and causes the central processing unit to execute the second image processing program to perform the second image processing operation; or the image processing processor management unit replaces a first image processing function used to perform the first image processing operation with a second image processing function according to the result of the first image processing operation and causes the image processing processor to perform the second image processing function to perform the second image processing operation.

14. The image forming apparatus as claimed in claim 13, wherein the first image processing operation is illegal copy detection; and the image processing processor management unit selects the second image processing function to be used to perform the second image processing operation based on a result of the illegal copy detection.

15. The image forming apparatus as claimed in claim 1, wherein an appropriate device of the image processing unit is selected depending on a type of the image processing operation.

16. The image forming apparatus as claimed in claim 15, wherein the appropriate device is at least one of an ASIC, a DSP, and a CPU.

17. The image forming apparatus as claimed in claim 16, wherein the type of image processing operation is at least one of a filter processing, a gradation processing, and a gamma processing implemented by the at least one of an ASIC, a DSP, and a CPU.

18. The image forming apparatus as claimed in claim 1, further comprising a filter processing unit, a gradation processing unit, and a gamma processing unit.

19. The image forming apparatus as claimed in claim 1, wherein the task management unit is configured to refer to flags retained in a memory to determine image processing operations provided in the at least one image processing unit depending on a type of image processing.

20. An image processing unit connectable to an image forming apparatus, which image forming apparatus includes an image scanning unit configured to generate image data by converting light reflected from an optically scanned printed page into electrical signals, an interface configured to receive image data from an external apparatus, an expansion bus to which the image scanning unit and the interface are connected, a bus control unit configured to control the expansion bus, a task management unit configured to generate an image processing request, and an image data storage unit configured to store the image data generated by the image scanning unit or the image data received via the interface from the external apparatus, the image processing unit comprising:
   an image processing circuit configured to perform, according to the image processing request generated by the task management unit, an image processing operation on the image data generated by the image scanning unit or the image data received via the interface from the external apparatus,
   wherein the task management unit is configured to send the image processing request for requesting image processing to the image processing unit, to transfer image data from the image data storage unit to the image processing unit at a specific timing based on a processing status in the image processing unit, and to send the image processing request to the image processing unit to perform image processing according to a content of the image data and user instructions input from the external apparatus, and
   the image processing unit further includes:
   a resource and service management unit such that when a completion of setting operations or a completion of image processing operations for a previous image processing request has not been reported to the resource and service management unit, the resource and service management unit requests the task management unit to wait for a period of time and send the image processing request again, and
   an information conversion management unit configured to determine an image processing path based on the image processing request which image processing path defines image processing operations to be performed and a sequence of the image processing operations, the image processing path defines the image processing operations via at least one of gradation processing, gamma processing, and filter processing.

21. The image processing unit as claimed in claim 20, wherein the image processing unit is detachably connected to the expansion bus and is replaceable with another said image processing unit.

22. The image processing unit as claimed in claim 20, further comprising:
   a central processing unit; and
   an image processing processor; wherein
   the image processing unit, according to the image processing request, causes the central processing unit to execute an image processing program to perform an image processing operation or causes the image processing processor to perform an image processing function to perform an image processing operation.

23. The image processing unit as claimed in claim 22, wherein the image processing unit includes a table assigning different image processing operations to the central processing unit and the image processing processor; and causes either the central processing unit or the image processing processor to perform a corresponding image processing operation according to the table.

24. The image processing unit as claimed in claim 22, wherein the image processing program to be executed by the central processing unit is updatable and changeable and a different image processing program to be executed by the central processing unit can be added.

25. The image processing unit as claimed in claim 22, further comprising:
   an image processing unit control unit configured to control, according to the image processing path, the image processing operations performed by the central processing unit or the image processing processor.

26. The image processing unit as claimed in claim 25, wherein the image processing unit control unit determines, according to the image processing path, an image processing program to be executed by the central processing unit or an image processing function to be performed by the image processing processor.

27. The image processing unit as claimed in claim 25, wherein the information conversion management unit determines the image processing path depending on an input source of the image data which input source is one of the image scanning unit, the external apparatus, and the image data storage unit.

28. The image processing unit as claimed in claim 25, wherein the image data on which a first image processing operation has been performed by the image processing unit are sent via the expansion bus to the image data storage unit and temporarily stored therein; the image data are then sent back to the image processing unit; and a second image processing operation is performed on the image data by the image processing unit.

29. The image processing unit as claimed in claim 28, wherein the image processing unit control unit includes an image processing management unit configured to switch image processing programs to be executed by the central processing unit according to the image processing path; and/or an image processing processor management unit configured to switch image processing functions to be performed by the image processing processor according to the image processing path.

30. The image processing unit as claimed in claim 29, wherein, after the first image processing operation is performed on the image data and the image data are stored in the image data storage unit, the image processing management unit replaces a first image processing program used to perform the first image processing operation with a second image processing program according to the image processing path and causes the central processing unit to execute the second image processing program to perform the second image processing operation; or the image processing processor management unit replaces a first image processing function used to perform the first image processing operation with a second image processing function according to the image processing path and causes the image processing processor to perform the second image processing function to perform the second image processing operation.

31. The image processing unit as claimed in claim 30, wherein the first image processing operation is top-and-bottom identification and the second image processing operation is skew correction; and the image processing management unit performs the skew correction based on a result of the top-and-bottom identification.

32. The image processing unit as claimed in claim 29, wherein, after the first image processing operation is performed on the image data and the image data are stored in the image data storage unit together with a result of the first image processing operation, the image processing management unit replaces a first image processing program used to perform the first image processing operation with a second image processing program according to the result of the first image processing operation and causes the central processing unit to execute the second image processing program to perform the second image processing operation; or the image processing processor management unit replaces a first image processing function used to perform the first image processing operation with a second image processing function according to the result of the first image processing operation and causes the image processing processor to perform the second image processing function to perform the second image processing operation.

33. The image processing unit as claimed in claim 32, wherein the first image processing operation is illegal copy detection; and the image processing processor management unit selects the second image processing function to be used to perform the second image processing operation based on a result of the illegal copy detection.

34. An image processing method of an image processing unit connectable to an image forming apparatus, wherein the image forming apparatus includes an image scanning unit configured to generate image data by converting light reflected from an optically scanned printed page into electrical signals; an interface configured to receive image data from an external apparatus; an expansion bus to which the image scanning unit and the interface are connected; a bus control unit configured to control the expansion bus; a task management unit configured to generate an image processing request; and an image data storage unit configured to store the image data generated by the image scanning unit or the image data received via the interface from the external apparatus, said image processing method comprising:

an image processing request receiving step of receiving the image processing request generated by the task management unit, transferring the image data from the image data storage unit to the image processing unit at a specific timing based on a processing status in the image processing unit, and sending the image processing request to the image processing unit to perform image processing according to a content of the image data and user instructions input from the external apparatus; and an image processing performing an image processing operation on the image data generated by the image scanning unit or the image data received via the interface from the external apparatus according to the image processing request received in the image processing request receiving step, wherein the image processing unit further includes:

a resource and service management unit such that when a completion of setting operations or a completion of image processing operations for a previous image processing request has not been reported to the resource and service management unit, the resource and service management unit requests the task management unit to wait for a period of time and send the image processing request again, and an information conversion management unit configured to determine an image processing path based on the image processing request which image processing path defines image processing operations to be performed and a sequence of the image processing operations, the image processing path defines the image processing operations via at least one of gradation processing, gamma processing, and filter processing.

35. The image processing method as claimed in claim 34, further comprising:

an information conversion step of determining an image processing path based on the image processing request which image processing path defines image processing operations to be performed and a sequence of the image processing operations; wherein, in the image processing step, a central processing unit of the image processing unit executes image processing programs to perform the image processing operations according to the image processing path or an image processing processor of the image processing unit performs image processing functions to perform the image processing operations according to the image processing path.

36. The image processing method as claimed in claim 35, wherein, in the information conversion step, the image processing path is determined depending on an input source of the image data which input source is one of the image scanning unit, the external apparatus, and the image data storage unit.

37. The image processing method as claimed in claim 35, further comprising:

an image processing management step of switching image processing programs to be executed by the central processing unit according to the image processing path and/or switching image processing functions to be performed by the image processing processor according to the image processing path.

38. The image processing method as claimed in claim 37, wherein, after a first image processing operation is performed on the image data and the image data are stored in the image data storage unit, a first image processing program used to perform the first image processing operation is replaced, in the image processing management step, with a second image processing program according to the image processing path and the second image processing program is executed by the central processing unit to perform a second image processing operation; or a first image processing function used to perform the first image processing operation is replaced, in the image processing management step, with a second image processing function according to the image processing path and the second image processing function is performed by the image processing processor to perform the second image processing operation.

39. The image processing method as claimed in claim 37, wherein, after a first image processing operation is performed on the image data and the image data are stored in the image data storage unit together with a result of the first image processing operation, a first image processing program used to perform the first image processing operation is replaced, in the image processing management step, with a second image processing program according to the result of the first image processing operation and the second image processing program is executed by the central processing unit to perform a second image processing operation; or a first image processing function used to perform the first image processing operation is replaced, in the image processing management step, with a second image processing function according to the result of the first image processing operation and the second image processing function is performed by the image processing processor to perform the second image processing operation.

40. A recording medium having an image processing control program embodied therein for causing a computer to perform the image processing method as claimed in claim 34.

* * * * *